United States Patent
Fukatani et al.

(10) Patent No.: US 7,160,624 B2
(45) Date of Patent: Jan. 9, 2007

(54) LAMINATED GLASS-USE INTERMEDIATE FILM AND LAMINATED GLASS

(75) Inventors: Juichi Fukatani, Koka-gun (JP); Tadahiko Yoshioka, Koka-gun (JP); Shinnen Kobata, Koka-gun (JP)

(73) Assignee: Sekisui Chemical Co., Ltd., Osaka (JP)

( * ) Notice: Subject to any disclaimer, the term of this patent is extended or adjusted under 35 U.S.C. 154(b) by 29 days.

(21) Appl. No.: 10/484,077

(22) PCT Filed: Jul. 26, 2002

(86) PCT No.: PCT/JP02/07583

§ 371 (c)(1),
(2), (4) Date: Jun. 21, 2004

(87) PCT Pub. No.: WO03/018502

PCT Pub. Date: Mar. 6, 2003

(65) Prior Publication Data

US 2004/0234778 A1 Nov. 25, 2004

(30) Foreign Application Priority Data

| | | |
|---|---|---|
| Jul. 26, 2001 | (JP) | 2001-226193 |
| Aug. 3, 2001 | (JP) | 2001-236554 |
| Aug. 23, 2001 | (JP) | 2001-253085 |
| May 8, 2002 | (JP) | 2002-133016 |
| May 8, 2002 | (JP) | 2002-133017 |
| May 8, 2002 | (JP) | 2002-133020 |

(51) Int. Cl.
*B32B 17/10* (2006.01)
*B32B 3/10* (2006.01)

(52) U.S. Cl. .................. 428/437; 428/46; 428/323; 428/339

(58) Field of Classification Search .............. 428/437, 428/46, 323, 339
See application file for complete search history.

(56) References Cited

U.S. PATENT DOCUMENTS 5,830,568 A * 11/1998 Kondo ................. 428/328
6,673,456 B1 * 1/2004 Kobata et al. .......... 428/437
2003/0021994 A1   1/2003 Kawamoto et al.
2003/0130435 A1   7/2003 Tanaka et al.

FOREIGN PATENT DOCUMENTS

| EP | 0 727 306 A2 | 8/1996 |
|---|---|---|
| EP | 727306 A2 | 8/1996 |
| EP | 1 136 457 A1 | 9/2001 |
| EP | 1136457 A1 | 9/2001 |
| EP | 1 193 048 A2 | 4/2002 |
| EP | 1 277 070 A1 | 7/2002 |
| JP | 61-52093 B2 | 11/1986 |
| JP | 64-36442 A | 2/1989 |
| JP | 02-022152 A | 1/1990 |
| JP | 2002-022152 A | 1/1990 |
| JP | 8-259279 | 10/1996 |
| JP | 10-297945 A | 11/1998 |
| JP | 2001-39741 A | 2/2001 |
| JP | 20001-39741 A | 2/2001 |
| JP | 2001-089202 A | 4/2001 |
| JP | 2001-302289 A | 10/2001 |
| WO | WO 01/25162 A1 | 4/2001 |
| WO | WO 02/060988 A1 | 8/2002 |

OTHER PUBLICATIONS

XP-002202744—Kenichi Fujita et al., Sunlight-Shielding Interlayers For Laminated Glass, 1999, Abstract.

* cited by examiner

*Primary Examiner*—Robert D. Harlan
(74) *Attorney, Agent, or Firm*—Sughrue Mion, PLLC

(57) ABSTRACT

An object of the present invention is to provide an interlayer film for a laminated glass and a laminated glass, which are superior in transparency, heat shield property, electromagnetic wave permeability and weatherability.

The present invention is directed to an interlayer film for a laminated glass, wherein a laminated glass, produced by interposing the film between two sheets of glass selected from the group consisting of clear glass, green glass and high heat ray absorbing glass, has an electromagnetic wave shielding performance of 10 dB or less at a frequency of 0.1 to 10 MHz and 2 to 26.5 GHz, a haze of 1.0% or less, a visible light transmittance of 70% or more and a solar radiation transmittance of 85% or less of the visible light transmittance in a wavelength region of 300 nm to 2100 nm.

15 Claims, No Drawings

LAMINATED GLASS-USE INTERMEDIATE FILM AND LAMINATED GLASS

TECHNICAL FIELD

The present invention relates to an interlayer film for a laminated glass superior in transparency, heat shield property, electromagnetic wave permeability and weatherability, as well as laminated glass thereof.

BACKGROUND ART

A laminated glass is safe because even it is damaged from an external impact, few fragments thereof are scattered. It, therefore, has conventionally been employed widely as window for vehicles such as automobiles, aircraft, buildings and the like. Example of such laminated glass includes those obtained by interposing an interlayer film for a laminated glass, which hereinafter is sometimes referred to as an "interlayer film", made of polyvinyl acetal resin, for example, polyvinyl butyral resin plasticized with a plasticizer, between at least a pair of glass sheets and then uniting them.

The laminated glass using therein such interlayer film is superior in safety, but it has a problem of poor heat insulation. Generally, among lights, an infrared radiation having a wavelength of 780 nm or more demonstrates, in comparison to an ultraviolet radiation, a greater thermal action even though it has an energy as small as about 10% of that of ultraviolet radiations, and once it is absorbed into a material, it is released as heat to cause an temperature increase. The infrared radiation is therefore called a heat ray. Accordingly, if a front glass or a side glass of an automobile is made possible to shield the infrared radiation shone thereto, the heat shield property is improved and the temperature increase inside of the automobile can be inhibited.

As a glass sheet with improved heat insulation-property, a heat ray-cutting glass and the like is available commercially. The heat ray-cutting glass is a product obtained by applying a multilayer coating of metal/metal oxide onto a surface of a glass sheet by metallic coating, sputtering or the like for the purpose of shielding direct solar radiation. Since a coating layer is less resistant to external scratches and also to chemicals, the heat ray-cutting glass is fabricated into a laminated glass by laminating an interlayer film such as a plasticized polyvinyl butyral resin film. However, in practice, radiations within the mid-infrared region, in which region human beings feel the heat feeling most, are not cut effectively. In particular, radiations in regions where human beings feel the heat feeling through the temperature rise of the epidermis of the skin (1400 to 1600 nm and 1800 to 2000 nm) and radiations in regions where the radiations reach nerve endings in the deep layer of the skin and human beings feel a feeling of stimulation therefrom (1200 to 1400 nm, 1600 to 1800 nm and 2000 to 2400 nm) have not been fully cut.

Moreover, the heat ray-cutting glass with a multilayer coating of metal/metal oxide is problematic in that the glass is expensive; that the transparency (the transmittance of visible light) is low because the coating layer is thick; that the adhesion between the coating layer and the interlayer film is reduced to cause delamination or whitening of the interlayer film; and that penetration of electromagnetic waves, in particular, those within a communication wavelength region is inhibited and trouble will be caused on communication function of cellular phone, car navigation system, garage opener and automatic cash receiver and the like.

As solutions to such problems, Japanese Kokoku Publication Sho-61-52093, Japanese Kokai Publication Sho-64-36442 and the like propose laminated glasses using an interlayer film comprising a metallic coating polyester film interposed between plasticized polyvinylacetal resin sheets. These laminated glasses, however, are problematic in adhesion of the plasticized polyvinylacetal resin sheet to the polyester film and, therefore, cause delamination at their interfaces. Moreover, they are insufficient in electromagnetic wave permeabilities, in particular, permeabilities of electromagnetic waves within a communication wavelength region.

With advancement of the highly information-oriented society, increase in speed and improvement in performance have recently been required in the fields of information processing and information communication. In the field of information communication, the frequency used is shifting from the ultra-high frequency band (300 MHz to 1 GHz) to the quasi-microwave band (1 to 3 GHz) with increase in communication capacity of mobile communication equipment such as cellular phone and car navigation system. In late years, introduction of the ETC (Electric Toll Collection System), which has been put into practical use in Europe, is pushed forward also in Asian countries. The ETC is a system, which makes it possible to pay fees automatically and go through tollgates without stopping there by road-to-vehicle communicating between an antenna mounted at the gate of a tollbooth and on-board equipment mounted to a vehicle.

In Japan, that system is under trial use at 54 tollbooths in a metropolitan area in and around Chiba area since Apr. 24, 2000. The system is scheduled to be adopted at about 600 tollbooths on the Tomei, Meishin and Chuo Expressways in the fiscal 2001 and is also planned to be rolled out nationally so as to be adopted at 900 tollbooths by the end of March, 2003. The system under global standardization is the 5.8 GHz-band active system. Therefore, the permeability of the electromagnetic waves of this wavelength band, in particular, the permeability of the electromagnetic waves of a communication wave region will become very important. Such high frequency waves have a nature of being lost through their conversion into heat. Therefore, an efficient transmission of electric signals requires materials of small transmission loss. Low dielectric materials are demanded.

In addition to the above-mentioned, frequency band employed are a 2.5 GHz for VICS (vehicle information and communication system), a 3.5 MHz band and a 7 MHz band for amateur radio and a 10 MHz or less for an emergency communication frequency, respectively. Moreover, a 12 GHz band is used for satellite broadcasting.

Generally it is known that the dielectric loss is represented by the following formula (1):

$$\text{Dielectric loss} = (27.3 \times f/C) \times \epsilon\gamma^{1/2} \times \tan\delta \quad (1)$$

In formula (1), f, C, $\epsilon\gamma$ and $\tan\delta$ denote a frequency, an electrostatic capacity, a relative permittivity, and a dielectric dissipation factor, respectively.

According to formula (1), the dielectric loss becomes greater with increase of the frequency. When the dielectric loss increases, the action of absorbing high-frequency signals and converting into heat is enhanced and it becomes impossible to transmit signals efficiently. To keep the dielectric loss small, it is necessary to make the relative permittivity and the dielectric dissipation factor small. Since the dielectric loss is in direct proportion to the dielectric dissipation factor, whereas it is in proportion to the square root of the relative permittivity. Therefore, it is necessary to select a material of small dielectric dissipation factor for high frequency. The measurement of a dielectric constant, although being an indirect approach, will make it possible to evaluate the electromagnetic wave shielding performance. The relative permittivity serves mainly as an index of the reflectance of electromagnetic waves, whereas the dielectric dissipation factor serves mainly as an index of the absorptivity of electromagnetic waves.

However, in the heat ray-cutting glass in which a multilayer coating of metal/metal oxide is applied to a surface of a glass sheet and a laminated glass comprising a metallic coating polyester film interposed between plasticized polyvinylacetal resin sheets of the prior art described above, a heat ray-cutting material is metal and/or conductive metal oxide tin film. They, therefore, shield electromagnetic waves as well as heat rays and accordingly cannot satisfy both shielding of heat rays and permeability of electromagnetic waves (mainly of a communication wavelength region), namely, both a low relative permittivity and a low dielectric dissipation factor.

Moreover, conventionally used heat reflecting glass or heat reflecting laminated glass using a heat reflecting polyethylene terephthalate (PET) are problematic in processability, workability, productivity and the like and are further problematic in that they will cause troubles on communication functions such as cellular phone, car navigator, garage opener and electric toll collection system.

On the other hand, Japanese Kokai Publication 2001-302289 discloses a laminated glass in which metal oxide having a heat shield property such as tin-doped indium oxide is dispersed in its interlayer film. This laminated glass is superior in the heat shield property and the electromagnetic wave permeability because of the use of a heat shield interlayer film. However, in its durability tests to heat, light and the like, the durability test time and the deterioration in visible light transmittance are in proportion to each other. The laminated glass demonstrates a greater reduction in visible light transmittance in comparison to laminated glasses using normal interlayer films and it tends to greatly increase in yellow index value, which is an index of yellowish hue, and in b* value in the CIE1976 L*a*b* color system. For example, there is a legal provision on lower limit of visible light transmittance for use of laminated glass as a front glass of an automobile. Therefore, it is particularly important that the visible light transmittance does not change during a durability test. It is undesirable from the viewpoint of external appearance that a heat shield interlayer film, which is normally light blue, be yellowish or cause yellowing due to its weathering deterioration. However, the conventional interlayer film containing tin-doped indium oxide is problematic in that the durabilities of its optical qualities such as visible light transmittance, yellow index value and b* value in the CIE1976 L*a*b* color system.

SUMMARY OF THE INVENTION

An object of the present invention is to provide an interlayer film for a laminated glass and a laminated glass, which are superior in transparency, heat shield property, electromagnetic wave permeability and weatherability.

A first aspect of the present invention is directed to an interlayer film for a laminated glass, wherein a laminated glass, produced by interposing the film between two sheets of glass selected from the group consisting of clear glass, green glass and high heat ray absorbing glass, has an electromagnetic wave shielding performance of 10 dB or less at a frequency of 0.1 to 10 MHz and 2 to 26.5 GHz, a haze of 1.0% or less, a visible light transmittance of 70% or more and a solar radiation transmittance of 85% or less of the visible light transmittance in a wavelength region of 300 nm to 2100 nm.

A second aspect of the present invention is directed to an interlayer film for a laminated glass, which has a relative permittivity of 4.5 or less and/or a dielectric dissipation factor, tan δ, of 0.1 or less at a measurement frequency of 1 MHz to 1.86 GHz, and a laminated glass, produced by interposing the film between two sheets of glass selected from the group consisting of clear glass, green glass and high heat ray absorbing glass, has a haze of 1.0% or less, a visible light transmittance of 70% or more, and a solar radiation transmittance of 85% or less of the visible light transmittance in the wavelength region of 300 nm to 2100 nm. The interlayer film for a laminated glass of the second aspect of the present invention preferably has a relative permittivity of 4.2 or less and/or a dielectric dissipation factor, tan δ, of 0.08 or less at a measurement frequency of 10 MHz. The film preferably has a relative permittivity of 3.8 or less and/or a dielectric dissipation factor, tan δ, of 0.08 or less at a measurement frequency of 100 MHz. The film preferably has a relative permittivity of 3.4 or less and/or a dielectric dissipation factor, tan δ, of 0.08 or less at a measurement frequency of 1 GHz. The film preferably has a relative permittivity of 3.3 or less and/or a dielectric dissipation factor, tan δ, of 0.08 or less at a measurement frequency of 1.8 GHz.

A third aspect of the present invention is directed to an interlayer film for a laminated glass, wherein a laminated glass, produced by interposing the film between two sheets of glass selected from the group consisting of clear glass, green glass and high heat ray absorbing glass, has a haze of 1.0% or less, a visible light transmittance of 70% or more, a solar radiation transmittance of 85% or less of the visible light transmittance in the wavelength region of 300 nm to 2100 nm, and a mid-infrared ray transmittance of 20% or less in the wavelength region of 1500 to 2100 nm. The interlayer film for a laminated glass of the third aspect of the present invention preferably has a near-infrared ray transmittance of 70% or less in the wavelength region of 780 to 1500 nm.

A fourth aspect of the present invention is directed to an interlayer film for a laminated glass, wherein a laminated glass, produced by interposing the film between two sheets of glass selected from the group consisting of clear glass, green glass, and high heat ray absorbing glass, has a haze of 1.0% or less, a visible light transmittance of 70% or more, a solar radiation transmittance of 85% or less of the visible light transmittance in the wavelength region of 300 nm to 2100 nm, and in a solar radiation transmittance integral T in the wavelength region of 300 to 2500 nm, a ratio Tb of the solar radiation transmittance integral of 10.0% or less in the wavelength region of 1400 to 1600 nm and/or a ratio Td of the solar radiation transmittance integral of 2.0% or less in the wavelength region of 1800 to 2000 nm.

A fifth aspect of the present invention is directed to an interlayer film for a laminated glass, wherein a laminated glass, produced by interposing the film between two sheets of glass selected from the group consisting of clear glass, green glass and high heat ray absorbing glass, has a haze of 1.0% or less, a visible light transmittance of 70% or more, a solar radiation transmittance of 85% or less of the visible light transmittance in the wavelength region of 300 nm to 2100 nm, and in a solar radiation transmittance integral T in the wavelength region of 300 to 2500 nm, a ratio Ta of a solar radiation transmittance integral of 15.0% or less in the wavelength region of 1200 to 1400 nm and/or a ratio Tc of the solar radiation transmittance integral of 3.0% or less in the wavelength region of 1600 to 1800 nm and/or a ratio Te of the solar radiation transmittance integral of 2.0% or less in the wavelength region of 2000 to 2400 nm.

A sixth aspect of the present invention is directed to an interlayer film for a laminated glass, wherein a laminated glass, produced by interposing the film between two sheets of glass selected from the group consisting of clear glass, green glass, and high heat ray absorbing glass, has a haze of 1.0% or less, a visible light transmittance of 70% or more, a solar radiation transmittance of 85% or less of the visible light transmittance in the wavelength region of 300 nm to 2100 nm, and in a solar radiation transmittance integral T in the wavelength region of 300 to 2500 nm, a ratio Ta of the solar radiation transmittance integral of 15.0% or less in the wavelength region of 1200 to 1400 nm and/or a ratio Tb of the solar radiation transmittance integral of 10.0% or less in the wavelength region of 1400 to 1600 nm and/or a ratio Tc of the solar radiation transmittance integral of 3.0% or less in the wavelength region of 1600 to 1800 nm and/or a ratio Td of the solar radiation transmittance integral of 2.0% or less in the wavelength region of 1800 to 2000 nm and/or a ratio Te of the solar radiation transmittance integral of 2.0% or less in the wavelength region of 2000 to 2400 nm.

A seventh aspect of the present invention is directed to an interlayer film for a laminated glass, wherein a laminated glass, produced by interposing the film between two sheets of glass selected from the group consisting of clear glass, green glass and high heat ray absorbing glass, has the decrease of the visible light transmittance of the laminated glass after irradiating the ultraviolet ray of 2.0% or less, when irradiated with ultraviolet ray with an intensity of 100 mW/cm$^2$ and wavelength of 295 to 450 nm for 300 hours. In the interlayer film for a laminated glass of the seventh aspect of the present invention, it is preferable that a laminated glass, produced by interposing the film between two sheets of glass selected from the group consisting of clear glass, green glass and high heat ray absorbing glass, has the increase of the yellow index value of the laminated glass after irradiating the ultraviolet ray of 4.0 or less, when irradiated with ultraviolet ray with an intensity of 100 mW/cm$^2$ and wavelength of 295 to 450 nm for 300 hours. It is also preferable that has the increase of the b* value of the laminated glass, in the CIE 1976 L*a*b* color system, after irradiating the ultraviolet ray of 3.0 or less.

In the interlayer film for a laminated glass according to the first, second, third, fourth, fifth, sixth or seventh aspect of the present invention, it is preferable that the solar radiation transmittance is 85% or less of the visible light transmittance in a wavelength region of 300 to 2100 nm.

In the interlayer film for a laminated glass according to the first, second, third, fourth, fifth, sixth or seventh aspect of the present invention, it is preferable that the film is made of plasticized polyvinylacetal resin composition, the plasticized polyvinylacetal resin composition contains 100 parts by weight of a polyvinylacetal resin, 20 to 60 parts by weight of a plasticizer and 0.1 to 3 parts by weight of at least one kind of a fine particle selected from the group consisting of a tin-doped indium oxide (ITO) fine particle, an antimony-doped tin oxide (ATO) fine particle, an aluminum-doped zinc oxide (AZO) fine particle, an indium-doped zinc oxide (IZO) fine particle, a tin-doped zinc oxide fine particle, a silicon-doped zinc oxide fine particle, a lanthanum hexaboride fine particle and a cerium hexaboride fine particle, and the fine particle has an average particle diameter of 80 nm or less, and a particle having a particle diameter of 100 nm or more is dispersed in a density of one particle/µm$^2$ or less. In the interlayer film for a laminated glass according to the first, second, third, fourth, fifth, sixth or seventh aspect of the present invention, it is also preferable that the film is made of a plasticized polyvinylacetal resin composition, the plasticized polyvinylacetal resin composition contains 100 parts by weight of a polyvinylacetal resin, 20 to 60 parts by weight of a plasticizer and 0.00001 to 5 parts by weight of at least one kind of a compound selected from the group consisting of a diimmonium pigment, an aminium pigment, a phthalocyanine pigment, an anthraquinone pigment, a polymethine pigment, a benzenedithiol ammonium compound, a thiourea derivatives and a thiol metallic complexes, and the compound is dispersed uniformly within the plasticized polyvinylacetal resin composition. In the interlayer film for a laminated glass according to the first, second, third, fourth, fifth, sixth or seventh aspect of the present invention, it is also preferable that the film is made of a plasticized polyvinylacetal resin composition, the plasticized polyvinylacetal resin composition contains 100 parts by weight of a polyvinylacetal resin, 20 to 60 parts by weight of a plasticizer, 0.1 to 3 parts by weight of at least one kind of a fine particle selected from the group consisting of a tin-doped indium oxide (ITO) fine particle, an antimony-doped tin oxide (ATO) fine particle, an aluminum-doped zinc oxide (AZO) fine particle, an indium-doped zinc oxide (IZO) fine particle, a tin-doped zinc oxide fine particle, a silicon-doped zinc oxide fine particle, a lanthanum hexaboride fine particle and a cerium hexaboride fine particle and 0.00001 to 5 parts by weight of at least one kind of compound selected from the group consisting of a diimmonium pigment, an aminium pigment, a phthalocyanine pigment, an anthraquinone pigment, a polymethine pigment, a benzenedithiol ammonium compound, a thiourea derivatives and a thiol metallic complexes, the fine particle has an average particle diameter of 80 nm or less, and a particle having a particle diameters of 100 nm or more is dispersed in a density of one particle/µm$^2$ or less, and the compound is dispersed uniformly within the plasticized polyvinylacetal resin composition.

Here, it is preferable that the polyvinylacetal resin is a polyvinyl butyral resin. In addition, it is also preferable that the plasticized polyvinylacetal resin composition further contains a malonic ester compound and/or an oxalic acid anilide compound as an ultraviolet absorber. It is also preferable that the plasticized polyvinylacetal resin composition further contains, as an ultraviolet absorber, a mixture of a malonic ester compound and/or an oxalic acid anilide compound with at least one compound selected from the group consisting of a benzotriazole compound, a benzophenone compound, a triazine compound, a benzoate compound and hindered amine compound. It is also preferable that the plasticized polyvinylacetal resin composition further contains, as an adhesive adjuster, an alkali metal salt or alkaline-earth metal salt of an organic or inorganic acid, or a modified silicone oil. It is also preferable that the plasticized polyvinylacetal resin composition further contains, as a dispersion stabilizer, at least one kind of compound selected from the group consisting of sulfuric ester compound, phosphate ester compound, ricinoleic acid, polyricinoleic acid, polycarboxylic acid, a polyhydric alcohol surfactant, polyvinyl alcohol and polyvinyl butyral.

An eighth aspect of the present invention is directed to a laminated glass, obtained by using the interlayer film for a laminated glass according to the first, second, third, fourth, fifth, sixth or seventh aspect of the present invention.

A ninth aspect of the present invention is directed to a window material for vehicle, obtained by using the interlayer film for a laminated glass according to the first, second, third, fourth, fifth, sixth or seventh aspect of the present invention or the laminated glass according to the eighth aspect of the present invention. A vehicle, obtained by using the window material for vehicle according to the ninth aspect of the present invention is also one embodiment of the present invention.

A tenth aspect of the present invention is directed to a building material, obtained by using the interlayer film for a laminated glass according to the first, second, third, fourth, fifth, sixth or seventh aspect of the present invention or the laminated glass according to the eighth aspect of the present invention. A building, obtained by using the building material according the tenth aspect of the present invention is also one embodiment of the present invention.

DETAILED DISCLOSURE OF THE INVENTION

The interlayer film for a laminated glass according to the first aspect of the present invention demonstrates the following optical characteristics, when a laminated glass, produced by interposing the film between two sheets of glass selected from the group consisting of clear glass, green glass and high heat ray absorbing glass. In the present description, the high heat ray absorbing glass means a heat ray absorbing glass, which has a visible light transmittance of 75% or more and a transmittance of 65% or less throughout the entire wavelength region of 900 to 1300 nm. The thickness of the glass is preferably 2.5 mm for clear glass and 2 mm for green glass and high heat ray-absorbing glass.

In other words, the laminated glass demonstrates an electromagnetic wave shielding performance of 10 dB or less at frequencies of 0.1 to 10 MHz and 2 to 26.5 GHz. In the present description, the electromagnetic wave shielding performance means an indicator showing how much the electromagnetic wave of measuring frequency is attenuated when it penetrates the laminated glass. In the cases where the electromagnetic wave shielding performance within the frequency range is 10 dB or less, when the interlayer film for a laminated glass according to the first aspect of the present invention is used as a front glass or the like of an automobile, recently developed mobile communication equipment can be used even inside a car with no problems.

The laminated glass has a haze of 1.0% or less. If the haze exceeds 1.0%, a resulting laminated glass will have a transparency insufficient for practical use. In addition, the haze can be obtained through measurement of the haze of the laminated glass for the light of wavelengths of 340 to 1800 nm using an integral turbidity meter (manufactured by Tokyo Denshoku Co., Ltd.) according to JIS K 6714 "Methacrylic Resin Sheets For Aircrafts".

The laminate glass has a visible light transmittance of 70% or more. If the visible light transmittance is less than 70%, a resulting laminated glass will have a transparency insufficient for practical use. Such a laminated glass cannot comply with the regulations for vehicle front glass and affects good visibility. The visible light transmittance can be obtained through measurement of the visible light transmittance of the laminated glass for the light of wavelengths of 380 to 780 nm using a direct recording spectrophotometer (manufactured by Shimadzu Corporation, U-4000) according to JIS R 3106 "Testing method on transmittance, reflectance, emittance and solar radiation heat gain coefficient of flat glasses".

The laminated glass has a solar radiation transmittance of 85% or less of the visible light transmittance in a wavelength region of 300 to 2100 nm. If it exceeds 85%, a resulting laminated glass has a heat shield property insufficient for practical use. The solar radiation transmittance can be obtained through measurement of the transmittance of the laminated glass for the light of wavelengths of 300 to 2100 nm using a direct recording spectrophotometer (manufactured by Shimadzu Corporation, U-4000) according to JIS R 3106.

The thickness of the interlayer film for a laminated glass according to the first aspect of the present invention is not particularly restricted but may, taking the penetration resistance and weatherability required for laminated glass into consideration, the thickness is preferably 0.1 to 1.0 mm, for practical use. The thickness is more preferably 0.3 to 0.8 mm. In addition, for improvement in penetration resistance and the like, as appropriate, the interlayer film of the present invention may be employed while being laminated with other interlayer films.

The second aspect of the present invention is an interlayer film for a laminated glass, wherein a laminated glass, produced by interposing the film between two sheets of glass selected from the group consisting of clear glass, green glass and high heat ray absorbing glass, has a haze of 1.0% or less, a visible light transmittance of 70% or more, and a solar radiation transmittance of 85% or less of the visible light transmittance in the wavelength region of 300 nm to 2100 nm.

The interlayer film for a laminated glass according to the second aspect of the present invention has a relative permittivity of 4.5 or less and/or a dielectric dissipation factor, tan $\delta$, of 0.1 or less at a measurement frequency of 1 MHz to 1.86 GHz. Thus, the interlayer film for a laminated glass according to the second aspect of the present invention has a superior electromagnetic wave permeability.

The interlayer film for a laminated glass according to the second aspect of the present invention preferably, in addition, has a relative permittivity of 4.2 or less and/or a dielectric dissipation factor, tan $\delta$, of 0.08 or less at a measurement frequency of 10 MHz, and has a relative permittivity of 3.8 or less and/or a dielectric dissipation factor, tan $\delta$, of 0.08 or less at a measurement frequency of 100 MHz, and has a relative permittivity of 3.4 or less and/or a dielectric dissipation factor, tan $\delta$, of 0.08 or less at a measurement frequency of 1 GHz, and has a relative permittivity of 3.3 or less and/or a dielectric dissipation factor, tan $\delta$, of 0.08 or less at a measurement frequency of 1.86 GHz. Thus, the electromagnetic wave permeability of the interlayer film for a laminated glass according to the second aspect of the present invention becomes much superior.

The interlayer film for a laminated glass according to the second aspect of the present invention, a laminated glass, produced by interposing the film between two sheets of glass selected from the group consisting of clear glass, green glass and high heat ray absorbing glass, has a haze of 1.0% or less, a visible light transmittance of 70% or more, and a solar radiation transmittance of 85% or less of the visible light transmittance in the wavelength region of 300 nm to 2100 nm. Regarding these characteristics, this film is similar to the interlayer film for a laminated glass according to the first aspect of the present invention. In addition, with respect also to thickness, this film is similar to the interlayer film for a laminated glass according to the first aspect of the present invention.

The interlayer film for a laminated glass according to the third aspect of the present invention, a laminated glass, produced by interposing the film between two sheets of glass selected from the group consisting of clear glass, green glass and high heat ray absorbing glass, has a haze of 1.0% or less, a visible light transmittance of 70% or more, a solar radiation transmittance of 85% or less of the visible light transmittance in the wavelength region of 300 nm to 2100 nm, and a mid-infrared ray transmittance of 20% or less in the wavelength region of 1500 to 2100 nm.

The interlayer film for a laminated glass according to the third aspect of the present invention, a laminated glass, produced by interposing the film between two sheets of glass selected from the group consisting of clear glass, green glass and high heat ray absorbing glass, has the mid-infrared ray transmittance of 20% or less in the wavelength region of 1500 to 2100 nm. If the mid-infrared ray transmittance exceeds 20%, an effect of reducing a thermal sense stimulation of a resulting laminated glass becomes insufficient in practical use. The mid-infrared ray transmittance is preferably 15% or less and more preferably 10% or less. The mid-infrared ray transmittance can be obtained by measuring the transmittance of the laminated glass for the lights having wavelengths of 1500 to 2100 nm using a direct recording spectrophotometer (manufactured by Shimadzu Corporation, U-4000) according to JIS R 3106, standardizing the measurements using weighted coefficients provided in JIS Z 8722 and JIS R 3106, and determining the transmittances for the mid-infrared region having wavelengths of 1500 to 2100 nm.

Furthermore, the laminated glass preferably has a near-infrared ray transmittance of 70% or less in the wavelength region of 780 to 1500 nm. If the near-infrared ray transmittance exceeds 70%, the heat shield property of a resulting laminated glass becomes insufficient in practical use. The near-infrared ray transmittance is more preferably 60% or less and still more preferably 50% or less. The near-infrared ray transmittance can be obtained by measuring the transmittance of the laminated glass for the lights of wavelengths of 1500 to 2100 nm using a direct recording spectrophotometer (manufactured by Shimadzu Corporation, U-4000) according to JIS R 3106, standardizing the measurements using weighted coefficients provided in JIS Z 8722 and JIS R 3106, and determining the transmittances for the mid-infrared having wavelengths of 780 to 1500 nm.

The interlayer film for a laminated glass according to the third aspect of the present invention, a laminated glass, produced by interposing the film between two sheets of glass selected from the group consisting of clear glass, green glass and high heat ray absorbing glass, has a haze of 1.0% or less, a visible light transmittance of 70% or more, a solar radiation transmittance of 85% or less of the visible light transmittance in the wavelength region of 300 nm to 2100 nm. Regarding these characteristics, this film is similar to the interlayer film for a laminated glass according to the first aspect of the present invention. In addition, with respect also to thickness, this film is similar to the interlayer film for a laminated glass according to the first aspect of the present invention.

The interlayer film for a laminated glass according to the fourth aspect of the present invention, a laminated glass, produced by interposing the film between two sheets of glass selected from the group consisting of clear glass, green glass, and high heat ray absorbing glass, has a haze of 1.0% or less, a visible light transmittance of 70% or more, a solar radiation transmittance of 85% or less of the visible light transmittance in the wavelength region of 300 nm to 2100 nm, and in a solar radiation transmittance integral T in the wavelength region of 300 to 2500 nm, a ratio Tb of the solar radiation transmittance integral of 10.0% or less in the wavelength region of 1400 to 1600 nm and/or a ratio Td of the solar radiation transmittance integral of 2.0% or less in the wavelength region of 1800 to 2000 nm.

The interlayer film for a laminated glass according to the fifth aspect of the present invention, a laminated glass, produced by interposing the film between two sheets of glass selected from the group consisting of clear glass, green glass and high heat ray absorbing glass, has a haze of 1.0% or less, a visible light transmittance of 70% or more, a solar radiation transmittance of 85% or less of the visible light transmittance in the wavelength region of 300 nm to 2100 nm, and in a solar radiation transmittance integral T in the wavelength region of 300 to 2500 nm, a ratio Ta of a solar radiation transmittance integral of 15.0% or less in the wavelength region of 1200 to 1400 nm and/or a ratio Tc of the solar radiation transmittance integral of 3.0% or less in the wavelength region of 1600 to 1800 nm and/or a ratio Te of the solar radiation transmittance integral of 2.0% or less in the wavelength region of 2000 to 2400 nm.

The interlayer film for a laminated glass according to the sixth aspect of the present invention, a laminated glass, produced by interposing the film between two sheets of glass selected from the group consisting of clear glass, green glass, and high heat ray absorbing glass, has a haze of 1.0% or less, a visible light transmittance of 70% or more, a solar radiation transmittance of 85% or less of the visible light transmittance in the wavelength region of 300 nm to 2100 nm, and in a solar radiation transmittance integral T in the wavelength region of 300 to 2500 nm, a ratio Ta of the solar radiation transmittance integral of 15.0% or less in the wavelength region of 1200 to 1400 nm and/or a ratio Tb of the solar radiation transmittance integral of 10.0% or less in the wavelength region of 1400 to 1600 nm and/or a ratio Tc of the solar radiation transmittance integral of 3.0% or less in the wavelength region of 1600 to 1800 nm and/or a ratio Td of the solar radiation transmittance integral of 2.0% or less in the wavelength region of 1800 to 2000 nm and/or a ratio Te of the solar radiation transmittance integral of 2.0% or less in the wavelength region of 2000 to 2400 nm.

The interlayer film for a laminated glass according to the fourth aspect of the present invention, a laminated glass, produced by interposing the film between two sheets of glass selected from the group consisting of clear glass, green glass, and high heat ray absorbing glass, has a solar radiation transmittance integral T in the wavelength region of 300 to 2500 nm, a ratio Tb of the solar radiation transmittance integral of 10.0% or less in the wavelength region of 1400 to 1600 nm and/or a ratio Td of the solar radiation transmittance integral of 2.0% or less in the wavelength region of 1800 to 2000 nm. In other words the above-mentioned wavelength region where much absorption to the skin occurs is within the above-described range of the infrared rays, which cause human beings to feel the heat, it is possible to control a rise of skin temperature.

The interlayer film for a laminated glass according to the fifth aspect of the present invention, a laminated glass, produced by interposing the film between two sheets of glass selected from the group consisting of clear glass, green glass and high heat ray absorbing glass, has a solar radiation transmittance of 85% or less of the visible light transmittance in the wavelength region of 300 nm to 2100 nm, and in a solar radiation transmittance integral T in the wavelength region of 300 to 2500 nm, a ratio Ta of a solar radiation transmittance integral of 15.0% or less in the wavelength region of 1200 to 1400 nm and/or a ratio Tc of the solar radiation transmittance integral of 3.0% or less in the wavelength region of 1600 to 1800 nm and/or a ratio Te of the solar radiation transmittance integral of 2.0% or less in the wavelength region of 2000 to 2400 nm. In other words the above-mentioned wavelength region where a much permeability through the skin is obtained is within the above-described range of the infrared rays, which cause human beings to feel the heat, it is possible to control the infrared rays within the above wavelength region, to reach nerve endings to feel the heat in the deep layer of the skin, thereby controlling a feeling heat stimulation.

The interlayer film for a laminated glass according to the sixth aspect of the present invention, a laminated glass, produced by interposing the film between two sheets of glass selected from the group consisting of clear glass, green glass, and high heat ray absorbing glass, has a solar radiation transmittance integral T in the wavelength region of 300 to 2500 nm, a ratio Ta of the solar radiation transmittance integral of 15.0% or less in the wavelength region of 1200 to 1400 nm and/or a ratio Tb of the solar radiation transmittance integral of 10.0% or less in the wavelength region of 1400 to 1600 nm and/or a ratio Tc of the solar radiation transmittance integral of 3.0% or less in the wavelength region of 1600 to 1800 nm and/or a ratio Td of the solar radiation transmittance integral of 2.0% or less in the wavelength region of 1800 to 2000 nm and/or a ratio Te of the solar radiation transmittance integral of 2.0% or less in the wavelength region of 2000 to 2400 nm. In other words the above-mentioned wavelength region where much absorption to the skin occurs or much permeability through the skin is obtained is within the above-described range of the near-infrared rays, which cause human beings to feel the heat, it is possible to reduce the absorption of the infrared rays to the skin, thereby controlling a rise of skin temperature and it also is possible to control the infrared rays to reach nerve endings to feel the heat in the deep layer of the skin, thereby controlling a feeling of heat stimulation.

Each of the laminated glasses of the fourth, fifth and sixth aspects of the present invention, a laminated glass, produced by interposing the film between two sheets of glass selected from the group consisting of clear glass, green glass, and high heat ray absorbing glass, has a haze of 1.0% or less, a visible light transmittance of 70% or more, a solar radiation transmittance of 85% or less of the visible light transmittance in the wavelength region of 300 nm to 2100 nm. Regarding these characteristics, this film is similar to the interlayer film for a laminated glass according to the first aspect of the present invention. In addition, with respect also to thickness, this film is similar to the interlayer film for a laminated glass according to the first aspect of the present invention.

A seventh aspect of the present invention is directed to an interlayer film for a laminated glass, wherein a laminated glass, produced by interposing the film between two sheets of glass selected from the group consisting of clear glass, green glass and high heat ray absorbing glass, has the decrease of the visible light transmittance of the laminated glass after irradiating the ultraviolet ray of 2.0% or less, when irradiated with ultraviolet ray with an intensity of 100 mW/cm$^2$ and wavelength of 295 to 450 nm for 300 hours.

The interlayer film for a laminated glass according to the seventh aspect of the present invention, a laminated glass, produced by interposing the film between two sheets of glass selected from the group consisting of clear glass, green glass and high heat ray absorbing glass, has the decrease of the visible light transmittance of the laminated glass after irradiating the ultraviolet ray of 2.0% or less, when irradiated with ultraviolet ray with an intensity of 100 mW/cm$^2$ and wavelength of 295 to 450 nm for 300 hours. The decrease exceeds 2.0% means that the tin-doped indium oxide (which is hereinafter referred sometimes to as ITO) and/or polyvinylacetal resin is deteriorated seriously and it indicate that the interlayer film is insufficient in visible light transmittance resistant of the optical characteristics.

Considering the achievements for normal interlayer films and considering also the fact that when ITO fine particles are dispersed minutely and uniformly within an interlayer film, the transmitted light therethrough shows a bluish color, it is preferable for the interlayer film for a laminated glass of the seventh aspect of the present invention that a laminated glass, produced by interposing the film between two sheets of glass selected from the group consisting of clear glass, green glass and high heat ray absorbing glass, has the increase of the yellow index value of the laminated glass after irradiating the ultraviolet ray of 4.0 or less, more preferably 3.0 or less, when irradiated with ultraviolet ray with an intensity of 100 mW/cm$^2$ and wavelength of 295 to 450 nm for 300 hours. Furthermore, it is preferable that a laminated glass, produced by interposing the film between two sheets of glass selected from the group consisting of clear glass, green glass and high heat ray absorbing glass, has the increase of the b* value of the laminated glass, in the CIE 1976 L*a*b* color system, after irradiating the ultraviolet ray of 3.0 or less, more preferably 2.0 or less, when irradiated with ultraviolet ray with an intensity of 100 mW/cm$^2$ and wavelength of 295 to 450 nm for 300 hours.

The yellow index value and the b* value in the CIE 1976 L*a*b* color system can determined from measured data obtained in the measurement of visible light transmittance.

In order for the interlayer film for a laminated glass according to the seventh aspect of the present invention to satisfy such requirements as visible light transmittance, yellow index value and b* value in the CIE1976 L*b*a* color system, it is preferable that the plasticized polyvinylacetal resin composition used for the interlayer film for a laminated glass according to the seventh aspect of the present invention contains the malonic ester compound and/or oxalic acid anilide compound described later.

It is preferable for the interlayer film for a laminated glass according to the seventh aspect of the present invention that a laminated glass, produced by interposing the film between two sheets of glass selected from the group consisting of clear glass, green glass and high heat ray absorbing glass, has a haze of 1.0% or less, a visible light transmittance of 70% or more, and a solar radiation transmittance of 85% or less of the visible light transmittance in the wavelength region of 300 nm to 2100 nm. Regarding these characteristics, this film is similar to the interlayer film for a laminated glass according to the first aspect of the present invention. In addition, with respect also to thickness, this film is similar to the interlayer film for a laminated glass according to the first aspect of the present invention.

In the interlayer film for a laminated glass according to the first, second, third, fourth, fifth or seventh aspect of the present invention, it is preferable that the solar radiation transmittance is 85% or less of the visible light transmittance in a wavelength region of 300 to 2100 nm.

The interlayer film for a laminated glass according to the first, second, third, fourth, fifth or seventh aspect of the present invention is not particularly restricted but may, for example, be the interlayer film for a laminated glass, wherein the film is made of plasticized polyvinylacetal resin composition, the plasticized polyvinylacetal resin composition contains 100 parts by weight of a polyvinylacetal resin, 20 to 60 parts by weight of a plasticizer and 0.1 to 3 parts by weight of at least one kind of a fine particle selected from the group consisting of a tin-doped indium oxide (ITO) fine particle, an antimony-doped tin oxide (ATO) fine particle, an aluminum-doped zinc oxide (AZO) fine particle, an indium-doped zinc oxide (IZO) fine particle, a tin-doped zinc oxide fine particle, a silicon-doped zinc oxide fine particle, a lanthanum hexaboride fine particle and a cerium hexaboride fine particle, and the fine particle has an average particle diameter of 80 nm or less, and a particle having a particle diameter of 100 nm or more is dispersed in a density of one particle/$\mu m^2$ or less; the interlayer film for a laminated glass, wherein the film is made of a plasticized polyvinylacetal resin composition, the plasticized polyvinylacetal resin composition contains 100 parts by weight of a polyvinylacetal resin, 20 to 60 parts by weight of a plasticizer and 0.00001 to 5 parts by weight of at least one kind of a compound selected from the group consisting of a diimmonium pigment, an aminium pigment, a phthalocyanine pigment, an anthraquinone pigment, a polymethine pigment, a benzenedithiol ammonium compound, a thiourea derivatives and a thiol metallic complexes, and the compound is dispersed uniformly within the plasticized polyvinylacetal resin composition; and the interlayer film for a laminated glass, wherein the film is made of a plasticized polyvinylacetal resin composition, the plasticized polyvinylacetal resin composition contains 100 parts by weight of a polyvinylacetal resin, 20 to 60 parts by weight of a plasticizer, 0.1 to 3 parts by weight of at least one kind of a fine particle selected from the group consisting of a tin-doped indium oxide (ITO) fine particle, an antimony-doped tin oxide (ATO) fine particle, an aluminum-doped zinc oxide (AZO) fine particle, an indium-doped zinc oxide (IZO) fine particle, a tin-doped zinc oxide fine particle, a silicon-doped zinc oxide fine particle, a lanthanum hexaboride fine particle and a cerium hexaboride fine particle and 0.00001 to 5 parts by weight of at least one kind of compound selected from the group consisting of a diimmonium pigment, an aminium pigment, a phthalocyanine pigment, an anthraquinone pigment, a polymethine pigment, a benzenedithiol ammonium compound, a thiourea derivatives and a thiol metallic complexes, the fine particle has an average particle diameter of 80 nm or less, and a particle having a particle diameters of 100 nm or more is dispersed in a density of one particle/$\mu m^2$ or less, and the compound is dispersed uniformly within the plasticized polyvinylacetal resin composition. Interlayer films for a laminated glass of such constitutions can satisfy the performances of interlayer film for a laminated glass of the first, second, third, fourth, fifth or seventh aspect of the present invention, mentioned above.

The polyvinylacetal resin is not particularly restricted and may use the one, which conventionally employed as resin for interlayer films for safety glass. For example, it having acetalization rate of 60 to 75 mol % and degrees of polymerization of 800 to 3000 is preferably used. If the polymerization is less than 800, the strength of resin film may become too weak, which may result in reduction in penetration resistance of the resulting laminated glass. On the other hand, if the polymerization exceeds 3000, it will be difficult to mold a resin film or the strength of resin film will become too strong, which may result in reduction in impact absorbing ability of the resulting laminated glass. Above all, polyvinyl butyral resin is preferred because of its appropriate adhesive force to glass, superior transparency and superior weatherability.

The polyvinylacetal resin can be obtained by acetalizing a polyvinyl alcohol by means of aldehyde. The polyvinyl alcohol is obtained usually by saponifying polyvinyl acetate, and polyvinyl alcohol having saponification rate of 80 to 99.8 mol % is generally used.

The polyvinyl alcohol resin preferably has a viscosity average polymerization degree of 200 to 3000. If the viscosity average polymerization degree is less than 200, the resulting laminated glass may reduce in penetration resistance, if the viscosity average polymerization degree exceeds 3000, the moldability of resin film may get worse, the rigidity of resin film may be too big, and the workability may get worse. More preferably, the polyvinyl alcohol resin has a viscosity average polymerization degree of 500 to 2000. In addition, the viscosity average polymerization degree and saponification rate of the polyvinyl alcohol resin can be determined according, for example, to JIS K 6726 "Testing methods for polyvinyl alcohol".

The aldehyde is not particularly restricted and may be usually employed such as an aldehyde having 1 to 10 carbonatom, and may, for example, include n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde and the like. Above all, preferably employed are n-butyraldehyde, n-hexylaldehyde and n-valeraldehyde. Particularly preferred is butylaldehyde, which has four carbon atoms.

The plasticizer is not particularly restricted if it is one usually employed for polyvinylacetal resin, and may use such as a plasticizer commonly employed for plasticizer of interlayer film, and may, for example, include organic plasticizer such as monobasic organic acid esters and polybasic organic acid esters; phosphoric acid plasticizer such as organic phosphoric acid, organic phosphorous acid. These plasticizers may be used each independently or in a combination of two or more species. They are properly used depending on the kind of the polyvinyl acetal resin in consideration of compatibility with resin, and the like.

The monobasic organic acid ester plasticizer is not particularly restricted and may, for example, include glycol based ester obtained through a reaction between glycol such as triethylene glycol, tetraethylene glycol or tripropylene glycol, and monobasic organic acid such as butyric acid, isobutyric acid, caproic acid, 2-ethylbutyric acid, heptylic acid, n-octylic acid, 2-ethylhexylic acid, pelargonic acid (n-nonylic acid) or decylic acid. Above all, preferably employed is monobasic organic acid ester of triethylene glycol such as triethylene glycol dicaproate, triethylene glycol di-2-ethylbutyrate, triethylene glycol di-n-octylate and triethylene glycol di-2-ethylhexylate.

The polybasic organic acid ester plasticizer is not particularly restricted and may, for example, include ester of polybasic organic acid such as adipic acid, sebacic acid or azelaic acid with linear or branched alcohol having 4 to 8 carbon atoms. Above all, preferably employed are dibutyl sebacate, dioctyl azelate, dibutylcarbitol adipate, and the like.

The organic phosphoric acid-based plasticizer is not particularly restricted and may, for example, include tributoxyethyl phosphate, isodecylphenyl phosphate and triisopropyl phosphate.

Of the above-mentioned plasticizers, triethylene glycol di-ethylbutyrate, triethylene glycol di-ethylhexylate, triethylene glycol di-butylsebacate are suitably used.

The composition amount of the plasticizer is preferably 20 to 60 parts by weight per 100 parts by weight of the polyvinylacetal resin. If the composition amount is less than 20 parts by weight, a resulting interlayer film or a laminated glass may have an insufficient impact absorbing property. If that amount exceeds 60 parts by weight, the plasticizer will bleed out and a resulting interlayer film or laminated glass may demonstrate a great optical strain or the transparency, the adhesion between glass and the interlayer film and the like are damaged. The composition amount is more preferably 30 to 50 parts by weight.

The at least one kind of fine particle selected from the group consisting of tin-doped indium oxide (ITO) fine particle, antimony-doped tin oxide (ATO) fine particle, aluminum-doped zinc oxide (AZO) fine particle, indium-doped zinc oxide (IZO) fine particle, tin-doped zinc oxide fine particle, silicon-doped zinc oxide fine particle, lanthanum hexaboride fine particle and cerium hexaboride fine particle is combined for the purpose of imparting a heat shield property to the interlayer film for a laminated glass of the present invention. Because these fine particles have a superior infrared (heat ray) shielding function, a resulting interlayer film for a laminated glass and a resulting laminated glass demonstrate superior heat shield properties.

The fine particle preferably has an average particle diameter of 80 nm or less. If the fine particle has an average particle diameter larger than 80 nm, visible ray will be scattered greatly by the particle and the transparency of resulting interlayer film may be affected. As a result, when the interlayer film is fabricated into laminated glass, its haze will be deteriorated and the film will not be able to satisfy high transparencies necessary for automotive front glass. The average particle diameter of the fine particle is more preferably 10 to 80 nm. The diameter of the fine particle can be measured by dynamic light scattering method using an Ar laser as a light source by use of a light scattering analyzer (for example, "DLS-6000AL" manufactured by Otsuka Electronics Co., Ltd.)

The fine particles are preferably dispersed finely and uniformly in an interlayer film. When the particles are dispersed finely and uniformly, when being fabricated into a laminated glass, it will have a low haze and a superior transparency, and the heat shield property will be great throughout the interlayer film. Moreover, since the adhesion force between glass and the interlayer film can be controlled, the interlayer film also has a superior penetration resistance.

In the interlayer film for a laminated glass according to the present invention, it is desirable that the fine particles be dispersed in such a manner that particles having particle diameter of 100 nm or more are dispersed of one particle/$\mu m^2$ or less. In other words, the fine particles are dispersed in such a manner that when the interlayer film of the present invention is photographed and observed through a transmission electron microscope, any fine particles having a particle diameter of 100 $\mu m$ or more are not found or, if they are found, when a fine particle having a particle diameter of 100 $\mu m$ or more is placed in the center of a frame of 1 $\mu m^2$, no other fine particles having a particle diameter of 100 $\mu m$ or more are found in the frame of 1 $\mu m^2$. Thus, when being fabricated into a laminated glass, it will have a low haze and a superior transparency, and the heat shield property will be great throughout the interlayer film. In addition the observation through a transmission electron microscope can be done by photographing at an acceleration voltage of 100 kV using an H-7100FA type transmission electron microscope manufactured by Hitachi, Ltd.

The composition amount of the fine particles is preferably 0.1 to 3 parts by weight per 100 parts by weight of the polyvinylacetal resin. If the composition amount is less than 0.1 parts by weight, the infrared ray shielding effect is not demonstrated enough and the heat shield property of a resulting interlayer film for a laminated glass or a resulting laminated glass may not be improved enough. On the other hand, if it exceeds 3 parts by weight, the visible light trancemittance of a resulting interlayer film for a laminated glass or of a resulting laminated glass may be reduced or the haze thereof may be increased.

The at least one kind of a compound selected from the group consisting of a diimmonium pigment, an aminium pigment, a phthalocyanine pigment, an anthraquinone pigment, a polymethine pigment, a benzenedithiol ammonium compound, a thiourea derivatives and a thiol metallic complexes is combined in order to impart a heat shield property to the interlayer film for a laminated glass of the present invention. Since these compounds have superior infrared ray (heat ray) shielding functions, a resulting interlayer film for a laminated glass and a resulting laminated glass demonstrate superior heat shield properties.

Those compounds are preferably dispersed uniformly in the plasticized polyvinylacetal resin composition. When the compounds are dispersed uniformly in the plasticized polyvinylacetal resin composition, when being fabricated into a laminated glass it will have a low haze and a superior transparency, and the heat shield property will be great throughout the interlayer film, moreover, since the adhesion force between glass and the interlayer film can be controlled, the interlayer film also has a superior penetration resistance.

The composition amounts of the compounds are preferably 0.00001 to 5 parts by weight per 100 parts by weight of the polyvinylacetal resin. If the composition amount is less than 0.00001 parts by weight, the infrared ray shielding effect is not demonstrated enough and the heat shield property of a resulting interlayer film for a laminated glass or a resulting laminated glass may not be improved enough. On the other hand, if it exceeds 5 parts by weight, the visible light permeability of a resulting interlayer film for a laminated glass or of a resulting laminated glass may be reduced or the haze thereof may be increased. The composition amounts are more preferably 0.0001 to 4 parts by weight, and still more preferably 0.001 to 3 parts by weight.

It is preferable that the plasticized polyvinylacetal resin composition further contains a malonic ester compound and/or an oxalic acid anilide compound as an ultraviolet absorber. The conventional interlayer films for a laminated glass have mainly use ultraviolet absorbers such as benzotriazole compounds. However, the present inventors found, through their earnest investigation, that the absorptions of these ultraviolet absorbers extend to the visible light region and, therefore, they make interlayer films yellowish even at the time of their addition; that since the ultraviolet absorbers have reactive functional groups such as a phenolic OH group, these will be big factors for the formation of complexes with heavy metal such as indium and tin and the complexes will colored in yellow to reduce the visible light transmittance; and that the fine particles wield a large influence over the durability of an interlayer film and the conventional ultraviolet absorbers are not suitable for dispersion systems of fine particles such as tin-doped indium oxide fine particles, therefore, the reduction of the tin-doped indium oxide fine particles may cause the oxidation of the surrounding matrix resin or the oxidation of the tin-doped indium oxide fine particles may cause yellowish coloration. The present inventors made a further investigation and found that when the malonic ester compound and/or the oxalic acid anilide compound is chosen as a ultraviolet absorber, an interlayer film containing a polyvinylacetal resin and ITO particles and the like can demonstrate a superior visible light transmittance, a superior yellow index value and a superior b* value in the CIE1976 L*a*b* color system and that there are small changes of these values even after ultraviolet rays irradiation.

The malonic acid ester compound is not particularly restricted and may, for example, include [(4-methoxyphenyl)-methylene]-dimethyl malonic ester (manufactured by Clariant, Hostavin PR-25). The oxalic acid anilide compound is not particularly restricted and may, for example, include 2-ethyl 2'-ethoxy-oxalnilide (manufactured by Clariant, Sanduvor VSU).

When the malonic ester compound and/or the oxalic acid anilide compound is contained as a ultraviolet absorber, the ITO fine particles themselves or a dispersion stabilizer is inhibited to undergo chemical changes due to energy of heat or light (particularly light within the ultraviolet region) or to affect to the polyvinylacetal resin matrix around those compounds. Therefore, it is possible to impart a high weatherability to the interlayer film of the present invention.

Since the malonic acid compound and the oxalic acid anilide compound demonstrate strong absorption in the UV-B region. They, therefore, are suitable for protecting the resin from ultraviolet rays having a wavelength of 300 to 320 nm, which cause deterioration of various resins. Those compounds can improve the weatherablity and light resistance of the interlayer film of the present invention. Since the absorbing regions of the malonic acid compound and the oxalic acid anilide compound do not overlap visible light, they do not cause coloration. Moreover, since those compounds have very high molar absorbance coefficient and small molecular weight, the amounts of ultraviolet rays absorbed by those compounds are greater than the same amounts of conventional ultraviolet absorbers. They, therefore, can reduce the content of ultraviolet absorbers to reduce the costs.

The malonic acid compound and the oxalic acid anilide compound have no functional group such as OH group, which may become a big factor for the formation of a complex with a heavy metal. They, therefore, do not form complexes even being applied with energy at a time of mixing during the preparation of the interlayer film of the present invention containing metal such as indium and tin or during a durability test. Accordingly, coloration into yellow or color change to yellow due to the complex formation hardly occurs and it is possible to inhibit the reduction in visible light transmittance.

The plasticized polyvinylacetal resin composition may further contains, as an ultraviolet absorber, a mixture of a malonic ester compound and/or an oxalic acid anilide compound with at least one compound selected from the group consisting of a benzotriazole compound, a benzophenone compound, a triazine compound, a benzoate compound and hindered amine compound.

The benzotriazole compound is not particularly restricted and may, for example, include 2-(2'-hydroxy-5'-methylphenyl)benzotriazole (manufactured by Ciba-Geigy AG, Tinuvin P), 2-(2'-hydroxy-3',5'-di-t-butylphenyl)benzotriazole (manufactured by Ciba-Geigy AG, Tinuvin 320), 2-(2'-hydroxy-3'-t-butyl-5'-methylphenyl)-5-chlorobenzotriazole (manufactured by Ciba-Geigy AG, Tinuvin 326), and 2-(2'-hydroxy-3',5'-di-amylphenyl)benzotriazole (manufactured by Ciba-Geigy AG, Tinuvin 328).

The benzophenone compound is not particularly restricted and may, for example, include octabenzone (manufactured by Ciba-Geigy AG, Chimassorb 81).

The triazine compound is not particularly restricted and may, for example, include 2-(4,6-diphenyl-1,3,5-triazine-2-yl)-5-[(hexyl)oxy]-phenol (manufactured by Ciba-Geigy AG, Tinuvin 1577FF).

The benzoate compound is not particularly restricted and may, for example, include 2,4-di-tert-butylphenyl-3,5-di-tert-butyl-4-hydroxybenzoate (manufactured by Ciba-Geigy AG, Tinuvin120).

The hindered amine compound is not particularly restricted and may, for example, include LA-57 (manufactured by Adeka Argus Chemical Co., Ltd.).

The content of the ultraviolet absorber is preferably 0.01 to 5.0 parts by weight per 100 parts by weight of the polyvinylacetal resin. If it is less than 0.01 parts by weight, almost no effect of absorbing ultraviolet rays is demonstrated, whereas if it exceeds 5.0 parts by weight, weather deterioration may be caused. The content is more preferably 0.05 to 1.0 parts by weight.

It is desirable that the plasticized polyvinylacetal resin composition further contains, as an adhesive adjuster, an alkali metal salt or alkaline-earth metal salt of an organic or inorganic acid, or a modified silicone oil.

The organic acid is not particularly restricted and may, for example, include carboxylic acids such as octylic acid, hexylic acid, butyric acid, acetic acid and formic acid. The inorganic acid is not particularly restricted and may, for example, include hydrochloric acid and nitric acid. The alkali metal salt and alkaline-earth metal salt are not particularly restricted and may, for example, include salts of potassium, sodium, magnesium and the like.

Of the alkali metal salt or alkaline-earth metal salt of organic or inorganic acids, preferred are alkali metal salt and alkaline-earth metal salt of organic acids having 2 to 16 carbon atoms. More preferred are potassium salt or magnesium salt of carboxylic acids having 2 to 16 carbon atoms. The potassium salt and magnesium salt of carboxylic acids having 2 to 16 carbon atoms is not particularly restricted and may, for example, include magnesium acetate, potassium acetate, magnesium propionate, potassium propionate, 2-magnesium ethylbutanoate, 2-potassium ethylbutanoate, 2-magnesium ethylhexaneate and 2-potassium ethylhexaneate. These may be used each independently or in a combination of two or more species.

When the adhesive adjuster is an alkali metal salt or alkaline-earth metal salt of an organic or inorganic acid, the content of the adhesive adjuster is preferably 0.0001 to 1.0 parts by weight per 100 parts by weight of the polyvinylacetal resin. If it is less than 0.0001 parts by weight, the adhesive force in the peripheral portion of the interlayer film may be reduced under a highly humid atmosphere, whereas if it exceeds 1.0 parts by weight, the adhesive force is reduced too much and the transparency of the interlayer film may be lost. The content is more preferably 0.001 to 0.5 parts by weight, and still more preferably 0.01 to 0.2 parts by weight.

The modified silicone oil is not particularly restricted and may, for example, include epoxy-modified silicone oil, ether-modified silicone oil, ester-modified silicone oil, amine-modified silicone oil and carboxyl-modified silicone oil. These may be used each independently or in a combination of two or more species. These modified silicone oils can be obtained generally by reacting a compound, which should be modified to polysiloxane.

The modified silicone oil preferably has a molecular weight of 800 to 5000. If the molecular weight is less than 800, it may lead to insufficient localization of the modified silicone oil to the surfaces of the interlayer film, whereas if the molecular weight exceeds 5000, compatibility of the modified silicone oil with the resin is reduced, so that the oil may bleed out to the surfaces of the film, resulting in reduction of the adhesive force between the film and the glasses. The molecular weight of the oil is more preferably 1500 to 4000.

When the adhesive adjuster is a modified silicone oil, the content of the adhesive adjuster is preferably 0.01 to 0.2 parts by weight per 100 parts by weight of the polyvinylacetal resin. If it is less than 0.01 parts by weight, the effect of preventing the whitening caused by moisture absorption may be insufficient, whereas if it exceeds 0.2 parts by weight, the compatibility of the modified silicone oil with the resin is reduced, so that the oil may bleed out to the surfaces of the film, resulting in reduction of the adhesive force between the film and the glasses. The content is more preferably 0.03 to 0.1 parts by weight.

In order to disperse the ITO fine particles minutely and uniformly in the interlayer film, it is desirable that the plasticized polyvinylacetal resin composition further contains a dispersion stabilizer. The dispersion stabilizer is not particularly restricted and may, for example, include organic or inorganic surfactant generally employed as dispersion stabilizers for inorganic fine particles. For example, at least one kind of compound selected from the group consisting of sulfuric ester compound, phosphate ester compound, ricinoleic acid, polyricinoleic acid, polycarboxylic acid, a polyhydric alcohol surfactant, polyvinyl alcohol and polyvinyl butyral is suitably employed.

The content of the dispersion stabilizer is preferably 0.0005 to 5.0 parts by weight per 100 parts by weight of the polyvinylacetal resin. If the content is less than 0.005 parts by weight, almost no effect by the dispersion stabilizer can be obtained, whereas, if it exceeds 5.0 parts by weight, foams are formed during the formation of an interlayer film or after being fabricated into a laminated glass, foams may be formed or the adhesion force between the interlayer film and glass may be increased too much. The content is more preferably. 0.05 to 1.0 parts by weight per 1.0 part by weight of the ITO fine particles.

It is preferable that the plasticized polyvinylacetal resin composition further contains an antioxidant. The antioxidant is employed for preventing a interlayer film composition from deterioration caused by the heat within an extruder.

The antioxidant is not particularly restricted and examples of phenol antioxidant may include 2,6-di-tert-butyl-p-cresol (BHT) (manufactured by Sumitomo Chemical Co., Ltd., Sumilizer BHT) and tetrakis[methylene-3-(3',5'-di-t-butyl-4'-hydroxyphenyl)propionato]methane (manufactured by Ciba-Geigy AG, Irganox 1010).

The content of the antioxidant is preferably 0.01 to 5.0 parts by weight per 100 parts by weight of the polyvinylacetal resin.

The plasticized polyvinylacetal resin composition may, as required, further contain additive agent such as light stabilizer, surfactant, flame retardant, antistatic agent, moisture resisting agent, heat ray reflecting agent and heat ray absorbing agent.

The method for preparing the interlayer films for a laminated glass of the present invention is not particularly restricted but may, for example, be a method adding a dispersion liquid comprising ITO fine particles or the like are dispersed uniformly in an organic solvent to a polyvinylacetal resin and then kneading the mixture.

The major dispersion medium used for the dispersion is not particularly restricted and may, for example, include plasticizers of the same types as the plasticizers employed and the dispersion stabilizers described above. Above all, preferably employed are plasticizers of the same types as the plasticizers employed.

The apparatus for mixing the ITO fine particles with the organic solvent is not particularly restricted and may, for example, be a planetary mixer, a wet mechanochemical apparatus, a Henschel mixer, a homogenizer, an ultrasonic irradiator and the like are generally employed.

The machine for kneading is not particularly restricted and may, for example, include extruder, plastograph, kneader, Banbury mixer and calender roll. Above all, extruder is referable from the viewpoint of continuous production.

During the kneading, the addition of a chelating agent and/or a compound having at least one carboxyl group in the kneaded material can further improve the haze of a resulting laminated glass. It is considered that the chelating agent improves the haze through its action of preventing ITO fine particles from agglomeration by coordinating to the ITO fine particles or the like, and that the compound having at least one carboxyl group improves the haze through its action of having a great dispersing ability and dispersion ITO fine particles or the like uniformly.

The chelating agent is not particularly restricted and may, for example, include EDTAs and β-diketones. Above all, β-diketones are preferable because of their good compatibilities with plasticizers or resin. In particular, acetylacetone is preferred. Benzoyltrifluoroacetone, dipivaloylmethane and the like besides acetylacetone may also be employed.

The composition amount of the chelating agent is preferably 0.001 to 2 parts by weight per 1.0 part by weight of the ITO fine particles or the like in the kneaded material. If the composition amount is less than 0.001 parts by weight, a satisfactory effect may not be expected. If it exceeds 2 parts by weight, foams may be formed during the film formation or the preparation of laminated glass. The composition amount is more preferably 0.01 to 1 parts by weight.

The compound having at least one carboxyl group is not particularly restricted and may, for example, include aliphatic carboxylic acid, aliphatic dicarboxylic acid, aromatic carboxylic acid, aromatic dicarboxylic acid, hydroxy acid and the like. More specifically, benzoic acid, phthalic acid, salicylic acid and ricinoleic acid are mentioned. Above all, aliphatic carboxylic acid having 2 to 18 carbon atoms is preferred. Aliphatic carboxylic acid having 2 to 10 carbon atoms is more preferred. Specific examples thereof include acetic acid, propionic acid, n-butyric acid, 2-ethylbutyric acid, n-hexanoic acid, 2-ethylhexanoic acid and n-octanoic acid.

The composition amount of the compound having at least one carboxyl group is preferably 0.001 to 2 parts by weight per 1.0 part by weight of the 1TO fine particles in the kneaded material. If the composition amount is less than 0.001 parts by weight, a satisfactory effect may not be expected. If it exceeds 2 parts by weight, a resulting interlayer film may turn yellow and the adhesion force between glass and the interlayer film may be reduced. The composition amount is more preferably 0.01 to 1 parts by weight.

The method for molding the interlayer film for a laminated glass of the present invention is not particularly restricted and may, for example, include method for forming into sheet by normal film forming method such as extrusion method, calendering method and pressing method. Above all, preferred is twin-screw co-rotating extrusion method, by which the haze can be further improved.

An eighth aspect of the present invention is a laminated glass, obtained by using the interlayer film for a laminated glass according to the first, second, third, fourth, fifth or seventh aspect of the present invention.

The glass used for the laminated glass of the eighth aspect of the present invention is not particularly restricted but transparent glass sheet generally employed is available, and may, for example, include various kinds of inorganic glass such as float glass sheets, polished glass sheets, figured glass sheets, wired glass sheets, stripe glass sheet, colored glass sheet, heat ray absorbing glass; and organic glass such as polycarbonate sheet and polymethyl methacrylate sheet. These glasses may be used each independently or in a combination of two or more species. Above all, using the heat ray absorbing glass is preferred.

The heat ray absorbing glass is not particularly restricted, but green glass is preferred. Of the heat ray absorbing glasses, use of a heat ray absorbing glass having a visible light transmittance of 75% or more and a transmittance within the wavelength region of 900 to 1300 nm of 65% or less can make the solar radiation transmittance low even relative to the same visible light transmittance and can improve the solar radiation cutting effectiveness because ITO fine particles can demonstrate great effectiveness of infrared cutting at wavelength longer than 1300 nm and relatively small effectiveness at a region of 900 to 1300 nm.

The above mentioned heat ray absorbing glass may be employed as both or either of a pair of glass sheets interposing an interlayer film.

The thickness of the glass is not particularly restricted and may be chosen appropriately depending on application.

The laminated glass according to the eighth aspect of the present invention can be produced by conventionally known methods using the interlayer film for a laminated glass of the present invention.

The laminated glass according to the eighth aspect of the present invention also includes a combination of the interlayer film of the present invention and a plastic film. In particular, for example, it includes a combination of the interlayer film of the present invention and a plastic film with no metal coating layer.

The laminated glass according to the eighth aspect of the present invention can have a heat ray cutting function because of use of the interlayer film for a laminated glass of the present invention and can secure the electromagnetic wave permeability because of its possession of no metal coating layer. Furthermore, the laminated glass demonstrates an improved crime prevention and also an improved penetration resistance because it comprises the plastic film.

The application of the laminated glass according to the eighth aspect of the present invention is not particularly restricted and may, for example, include front glass, side glass, rear glass and roof glass of automobile; glass portions of vehicle such as aircraft and electric train; and glass for building.

A ninth aspect of the present invention is directed to a window material for vehicle, obtained by using the interlayer film for a laminated glass according to the first, second, third, fourth, fifth, or seventh aspect of the present invention or the laminated glass according to the eighth aspect of the present invention. In addition, a vehicle, obtained by using the window material for vehicle according to the ninth aspect of the present invention is also one embodiment of the present invention.

A tenth aspect of the present invention is directed to a building material, obtained by using the interlayer film for a laminated glass according to the first, second, third, fourth, fifth, or seventh aspect of the present invention or the laminated glass according to the eighth aspect of the present invention. In addition, a building, obtained by using the building material according to the tenth aspect of the present invention is also one embodiment of the present invention.

BEST MODE FOR CARRYING OUT THE INVENTION

The following examples illustrate the present invention in further detail but are by no means limitative of the scope of the invention.

EXAMPLE 1

(1) Synthesis of Polyvinyl Butyral

To 2890 parts by weight of pure water, 275 parts by weight of polyvinyl alcohol having an average polymerization degree of 1700 and a saponification rate of 99.2 mol % was added and dissolved on heating. After the reaction system was adjusted to 15° C., 201 parts by weight of hydrochloric acid having a concentration of 35% by weight and 157 parts by weight of n-butyraldehyde were added and the mixture was held at the same temperature to precipitate a reaction product. The reaction system was then held at 60° C. for 3 hours to carry the reaction to completion. The mixture was washed with an excess of water to remove the unreacted n-butyraldehyde and the catalyst hydrochloric acid was neutralized with aqueous sodium hydroxide solution, the common neutralizing agent. The product was rinsed with an excess of water for 2 hours and dried to provide a polyvinyl butyral resin as white powder. The average butyralization rate of this resin was 68.5 mol %.

(2) Preparation of Heat Ray Absorber-dispersing Plasticizer

To 40 parts by weight of triethyleneglycol-di-ethylenebutyrate (3GO), one part by weight of ITO fine particles were added. By use of polyphosphate salt as an dispersing agent, ITO fine particles were dispersed in the plasticizer by means of a horizontal microbead mill. Afterwards, 0.1 parts by weight of acetylacetone was added to the dispersion under stirring to form a heat ray absorber-dispersing plasticizer. The average diameter of the ITO fine particles in the dispersion was 35 nm.

(3) Production of Interlayer Film for Laminated Glass

To 100 parts by weight of the resulting polyvinyl butyral resin were added 40 parts by weight of heat ray absorber-dispersing plasticizer and magnesium 2-ethylbutyrate so that the Mg content relative to the entire system became 60 ppm. The blend was melt-kneaded fully through mixing rolls and then was press molded with a press molding machine at 150° C. for 30 minutes to provide an interlayer film with an average thickness of 0.76 mm. The average diameter of the ITO fine particles in the film was 56 nm. No particles having diameters of 100 nm or more were not found in the film.

(4) Production of Laminated Glass

The resulting interlayer film for laminated glass was interposed between two transparent float glass sheets (30 cm in length, 30 cm in width, and 2.5 mm in thickness) and the unit was placed in a rubber bag and deaerated under a degree of vacuum of 2.6 kPa for 20 minutes. The deaerated unit was directly transferred to an oven and pressed under vacuum at 90° C. for 30 minutes. The prebonded laminated glass was compression bonded in an autoclave under conditions, a temperature of 135° C. and a pressure of 1.2 MPa, for 20 minutes to provide a laminated glass.

The laminated glass was measured for its visible light transmittance (Tv), solar radiation transmittance (Ts), haze (H), dielectric constant, electromagnetic wave permeability (ΔdB) and Pammer value by the following methods. The results are shown in Table 2.

(Measurements of Visible Light Transmittance (Tv) and Solar Radiation Transmittance (Ts))

The transmittance at 300 to 2500 nm of the laminated glass was measured by means of a direct recording spectrophotometer (manufactured by Shimadzu Coporation, UV3100). The visible light transmittance Tv at 380 to 780 nm and the solar radiation transmittance Ts at 300 to 2500 nm were then evaluated in accordance with JIS Z 8722 and JIS R 3106.

(Measurement of Haze (H))

The haze was measured in accordance with JIS K 6714.

(Measurement of Dielectric Constant)

An RF (radio frequency) Impedance/material analyzer ("4291B" manufactured by Hewlett-Packard Development Co., L.P.; measurable range: 1 MHz to 1.86 GHz) was using as a measuring apparatus. A Dielectric Material Test Fixture ("16453A" manufactured by Hewlett-Packard Development Co., L.P.) was used as a sample fixture. The dielectric constant was measured within a frequency range of 1 MHz to 1.86 GHz by applying an AC voltage to an interlayer film sample sandwiched between electrodes (the sample was held with the sample fixture while being held constant in thickness).

It is to be noted that poly(tetrafluoroethylene) (2.1, εγ'=2.1, tan δ=0 (ε'=0)) was employed as a reference material.

(Measurement of Electromagnetic Wave Shielding Performance (ΔdB))

The reflection loss (dB) within the range of 0.1 to 10 MHz of a laminated glass and that of a normal single-layer float glass 2.5 mm thick were compared through a measurement by KEC method (a near-field electromagnetic wave shielding effectiveness measurement). Thus, the minimum and maximum values of the difference within that frequency range were recorded.

On the other hand, regarding the reflection loss (dB) within the range of 2 to 26.5 GHz, a four-square sample having sides of 600 mm was set up between a pair of antennas for transmission and reception. An electric wave from an electric wave signal generator was received by a spectrum analyzer and the electromagnetic wave shielding performance of the sample was evaluated (a far-field electromagnetic wave measurement).

(Measurement of Pammer Value)

The laminated glass was left stand at −18±0.6° C. for 16 hours to be conditioned. It was then stricken to be crushed into fragment of glasses having a diameter of 6 mm or less by means of a hammer having a head weighing of 0.45 kg. The extent of exposure of the sheet after partial exfoliation of the glass was assessed against a graded limit samples in advance. The result was represented in Pammer value according to Table 1.

The Pammer value is a value used for rating the adhesion of an interlayer film to glass. The greater the Pammer value, the stronger the adhesive force.

TABLE 1

| Extent of exposure in interlayer film (%) | Pammer value |
|---|---|
| 100 | 0 |
| 90 | 1 |
| 85 | 2 |
| 60 | 3 |
| 40 | 4 |
| 20 | 5 |
| 100 | 6 |
| 5 | 7 |
| 2 or less | 8 |

EXAMPLE 2

A laminated glass was prepared in the same manner as Example 1 except changing the amount of the ITO in the heat ray absorber-dispersing plasticizer from 1 part by weight to 1.6 parts by weight. Thereafter, measurements the same as those conducted in Example 1 were carried out. The results of the measurements are shown in Table 2.

EXAMPLE 3

A laminated glass was prepared in the same manner as Example 1 except changing the amount of the ITO in the heat ray absorber-dispersing plasticizer from 1 part by weight to 2.8 parts by weight. Thereafter, measurements the same as those conducted in Example 1 were carried out. The results of the measurements are shown in Table 2.

EXAMPLE 4

A laminated glass was prepared in the same manner as Example 1 except interposing a 50 μm thick transparent PET film between two interlayer films each having an average thickness of 0.38 mm. Thereafter, measurements the same as those conducted in Example 1 were carried out. The results of the measurements are shown in Table 2.

COMPARATIVE EXAMPLE 1

A laminated glass was prepared in the same manner as Example 1 except adding no ITO, no dispersing agent and no acetylacetone. Thereafter, measurements the same as those conducted in Example 1 were carried out. The results of the measurements are shown in Table 2.

COMPARATIVE EXAMPLE 2

A laminated glass was prepared in the same manner as Example 1 except using a heat reflecting glass in place of one of the float glass sheets in the preparation of a laminated glass using a normal interlayer film (average thickness 0.38 mm) containing no ITO. Thereafter, measurements the same as those conducted in Example 1 were carried out. The results of the measurements are shown in Table 2.

COMPARATIVE EXAMPLE 3

A laminated glass was prepared interposing a heat reflection coated PET (polyethylene terephthalate) sheet between two normal interlayer films (average thickness 0.38 mm) containing no ITO and further interposing them from both sides with transparent float glass sheets. Thereafter, measurements the same as those conducted in Example 1 were carried out. The results of the measurements are shown in Table 2. It is noted that since the electromagnetic waves are shielded by the heat reflection coating, no measurement of electromagnetic wave permeability was conducted.

COMPARATIVE EXAMPLE 4

A laminated glass was prepared in the same manner as Example 1 except changing the composition amount of ITO to 0.03 parts by weight. Thereafter, measurements the same as those conducted in Example 1 were carried out. The results of the measurements are shown in Table 2.

COMPARATIVE EXAMPLE 5

A laminated glass was prepared in the same manner as Example 1 except changing the composition amount of ITO to 3.6 parts by weight. Thereafter, measurements the same as those conducted in Example 1 were carried out. The results of the measurements are shown in Table 2.

quently, 0.1 parts by weight of acetylacetone was added to this solution under stirring to provide a heat ray absorber-dispersing plasticizer.

(3) Production of Interlayer Film for Laminated Glass

To 100 parts by weight of polyvinyl butyral resin were added 40 parts by weight of heat ray absorber-dispersing plasticizer and magnesium 2-ethylbutyrate in a proper amount such that the Mg content relative to the entire system became 60 ppm. The blend was melt-kneaded fully through mixing rolls and then was press molded with a press molding machine at 150° C. for 30 minutes to provide an interlayer film with an average thickness of 0.76 mm. The ITO fine particles in this interlayer film had an average particle diameter of 56 nm. No particles having particle diameters of 100 nm or more were not found.

(4) Production of Laminated Glass

The resulting interlayer film was interposed between two transparent float glass sheets 30 cm in length, 30 cm in width, and 2.5 mm in thickness and the unit was placed in a rubber bag and deaerated under a degree of vacuum of

TABLE 2

|  | $T_V$(%) | $T_S$(%) | H(%) | Dielectric constant | | | | | Electromagnetic shielding performance (ΔdB) | Pammer value |
|  |  |  |  | 1 MHz | 10 MHz | 100 MHz | 1 GHz | 1.86 GHz |  |  |
| --- | --- | --- | --- | --- | --- | --- | --- | --- | --- | --- |
| Example 1 | 83 | 56 | 0.7 | 3.90 | 3.55 | 3.20 | 2.85 | 2.75 | 0~1 | 4 |
| Example 2 | 80 | 48 | 0.6 | 3.95 | 3.60 | 3.25 | 2.90 | 2.77 | 0~1 | 4 |
| Example 3 | 76 | 44 | 0.9 | 3.98 | 3.65 | 3.29 | 2.94 | 2.80 | 0~1 | 4 |
| Example 4 | 79 | 46 | 0.6 | 3.40 | 3.15 | 2.76 | 2.41 | 2.29 | 0~1 | 4 |
| Comparative Example 1 | 89 | 81 | 0.4 | 3.50 | 3.20 | 2.80 | 2.57 | 2.45 | 0~1 | 4 |
| Comparative Example 2 | 80 | 47 | 0.6 | Measurements could not be made | | | | | 15~48 | 1 |
| Comparative Example 3 | 78 | 47 | 0.7 | Measurements could not be made | | | | | 13~37 | 1 |
| Comparative Example 4 | 89 | 75 | 0.5 | 3.70 | 3.38 | 2.96 | 2.70 | 2.57 | 0~1 | 4 |
| Comparative Example 5 | 70 | 35 | 1.9 | 4.10 | 3.73 | 3.39 | 3.00 | 2.88 | 0~1 | 4 |

EXAMPLE 5

(1) Synthesis of Polyvinyl Butyral

To 2890 g of pure water, 275 g of polyvinyl alcohol having an average polymerization degree of 1700 and a saponification rate of 99.2 mole % was added and dissolved on heating. After the solution was adjusted to 15° C., 201 g of hydrochloric acid having a concentration of 35% by weight and 157 g of n-butyraldehyde were added and the mixture was incubated at 15° C. to precipitate a reaction product. Subsequently, the reaction system was held at 60° C. for 3 hours to carry the reaction to completion. The mixture was washed with an excess of water to remove the unreacted n-butyraldehyde and the catalyst hydrochloric acid was neutralized with aqueous sodium hydroxide solution, the common neutralizing agent. The product was rinsed with an excess of water for 2 hours and dried to provide a polyvinyl butyral resin as white powder. The average butyralization rate of this polyvinyl butyral resin was 68.5 mole %.

(2) Preparation of Heat Ray Absorber-dispersing Plasticizer

To 40 parts by weight of triethyleneglycol-di-ethylenebutyrate (3GO), 1 part by weight of ITO powder (manufactured by Mitsubishi Materials company) and 0.1 parts by weight of polyphosphate salt as a dispersing agent were added. The ITO fine particles were dispersed in the plasticizer by means of a horizontal microbead mill. Subse- 2660 Pa for 20 minutes. The deaerated unit was directly transferred to an oven and pressed under vacuum at 90° C. for 30 minutes. The prebonded laminated glass was compression bonded in an autoclave under conditions, a temperature of 135° C. and a pressure of 118 N/cm2, for 20 minutes to provide a laminated glass.

EXAMPLE 6

A laminated glass was prepared in the same manner as Example 5 except changing the composition amount of an ITO powder (manufactured by Mitsubishi Material Corporation) to 1.6 parts by weight.

EXAMPLE 7

A laminated glass was prepared in the same manner as Example 5 except changing the composition amount of an ITO powder (manufactured by Mitsubishi Materials Corporation) to 2.8 parts by weight.

EXAMPLE 8

A laminated glass was prepared in the same manner as Example 5 except changing the composition amount of an ITO powder (manufactured by Mitsubishi Materials Corporation) to 0.7 parts by weight and using two green glass sheets in place of the two transparent float glass sheets.

EXAMPLE 9

A laminated glass was prepared in the same manner as Example 5 except changing the composition amount of an ITO powder (manufactured by Mitsubishi Materials Corporation) to 0.7 parts by weight and using one green glass sheet and one high heat absorbing glass sheet in place of the two transparent float glass sheets.

EXAMPLE 10

A laminated glass was prepared in the same manner as Example 5 except preparing a heat ray absorber-dispersing plasticizer by adding 0.3 parts by weight of an ITO powder (manufactured by Mitsubishi Materials Corporation), 0.015 parts by weight of a diimmonium pigment (manufactured by Nippon Kayaku Co., Ltd., IRG-022ITO) and 0.1 parts by weight of a polyphosphate salt as a dispersing agent to 40 parts by weight of triethyleneglycol-di-ethylene butyrate (3GO), dispersing the ITO fine particle and the diimmoniu pigment in the plasticizer by means of a horizontal microbead mill, and adding 0.1 parts by weight of acetylacetone while stirring the solution.

EXAMPLE 11

A laminated glass was prepared in the same manner as Example 5 except preparing a heat ray absorber-dispersing plasticizer by adding 1 part by weight of an ITO powder (manufactured by Mitsubishi Materials Corporation), 0.015 parts by weight of a diimmonium pigment (manufactured by Nippon Kayaku Co., Ltd., IRG-022ITO) and 0.1 parts by weight of a polyphosphate salt as a dispersing agent to 40 parts by weight of triethylene glycol-di-ethylene butyrate (3GO), dispersing the ITO fine particle and the diimmoniu pigment in the plasticizer by means of a horizontal microbead mill, and adding 0.1 parts by weight of acetylacetone while stirring the solution.

COMPARATIVE EXAMPLE 6

A laminated glass was prepared in the same manner as Example 5 except adding no ITO powder, no dispersing agent and no acetylacetone.

COMPARATIVE EXAMPLE 7

A laminated glass was prepared in the same manner as Example 5 except adding no ITO powder and using a combination of one transparent float glass sheet and one heat reflecting glass sheet in place of the two transparent float glass sheets.

COMPARATIVE EXAMPLE 8

A laminated glass was prepared in the same manner as Example 5 except using, in place of the interlayer film having an average thickness of 0.76 mm, an interlayer film made of a heat reflection-coated PET interposed between two interlayer films having 0.38 mm in average thickness which were prepared in the same manner as Example 1 without using an ITO powder.

COMPARATIVE EXAMPLE 9

A laminated glass was prepared in the same manner as Example 5 except changing the composition amount of an ITO powder (manufactured by Mitsubishi Materials Corporation) to 0.03 parts by weight.

COMPARATIVE EXAMPLE 10

A laminated glass was prepared in the same manner as Example 5 except changing the composition amount of an ITO powder (manufactured by Mitsubishi Materials Corporation) to 3.6 parts by weight.

COMPARATIVE EXAMPLE 11

A laminated glass was prepared in the same manner as Example 5 except adding no ITO powder, no dispersing agent and no acetylacetone and using two green glass sheets in place of the two transparent float glass sheets.

COMPARATIVE EXAMPLE 12

A laminated glass was prepared in the same manner as Example 5 except adding no ITO powder, no dispersing agent and no acetylacetone and using a combination of one green glass sheet and one high heat absorbing glass sheet in place of the two transparent float glass sheets.

The laminated glasses prepared in Examples 5–11 and Comparative Examples 6 to 12 were measured for their visible light transmittances (Tv), solar radiation transmittances (Ts), hazes (H) and Pammer values in the same manners as those used in Example 1. In addition, their transmittances in the near infrared region within the wavelength region of 780 to 1500 nm and their transmittances in the mid-infrared region within the wavelength region of 1500 to 2100 nm were measured by the methods described below. Furthermore, the integrals of transmittance were determined by the method described below. The results are presented in Table 3.

(Measurements of Transmittances of Near Infrared Region and Mid-infrared Region)

The transmittance within the near infrared region of wavelength region 780 to 1500 nm, namely the "near infrared transmittance" $T_{nir}$, and the transmittance within the mid-infrared region of wavelength region 1500 to 2100 nm, namely the "mid-infrared transmittance" $T_{mir}$ were determined through standardization using weighted coefficients given in JIS Z 8722 and JIS R 3106.

(Measurements of Transmittance Integrals (Ta, Tb, Tc, Td and Te))

The integral (T) of the light transmittance within the solar radiation transmittance wavelength region (300 to 2500 nm) was determined by use of a direct recording spectrophotometer (commercial name "UV3100", manufactured by Shimadzu Corporation). In addition, the integrals in wavelength regions (Ta: 1200 to 1400 nm, Tb: 1400 to 1600 nm, Tc: 1600 to 1800 nm, Td: 1800 to 2000 nm, Te: 2000 to 2400 nm) were determined by the above-mentioned method. The ratios thereof to the solar radiation transmittance (T) were calculated using the following formulas. In the formulas, the subscripts indicate wavelength regions.

Formula for computation:

$$Ta(\%) = T_{1200 \text{ to } 1400}/T$$

$$Tb(\%) = T_{1400 \text{ to } 1600}/T$$

$Tc(\%) = T_{1600 \text{ to } 1800}/T$ $Td(\%) = T_{1800 \text{ to } 2000}/T$ $Te(\%) = T_{2000 \text{ to } 2400}/T$

|  | $T_V$(%) | $T_S$(%) | H(%) | $T_{nir}$(%) | $T_{mir}$(%) | Transmittance integral (%) | | | | | Pammer value |
|---|---|---|---|---|---|---|---|---|---|---|---|
|  |  |  |  |  |  | Ta | Tb | Tc | Td | Te |  |
| Example 5 | 83 | 56 | 0.7 | 47.38 | 0.1 or less | 2.90 | 0.20 | 0.06 | 0.04 | 0.09 | 4 |
| Example 6 | 80 | 48 | 0.6 | 41.45 | 0.1 or less | 2.60 | 0.17 | 0.05 | 0.03 | 0.08 | 4 |
| Example 7 | 76 | 44 | 0.9 | 38.92 | 0.1 or less | 2.10 | 0.13 | 0.05 | 0.03 | 0.07 | 4 |
| Example 8 | 75 | 43 | 0.7 | 23.61 | 0.30 | 3.12 | 0.26 | 0.07 | 0.06 | 0.10 | 4 |
| Example 9 | 70 | 39 | 0.7 | 17.56 | 0.10 | 2.56 | 0.19 | 0.06 | 0.06 | 0.09 | 4 |
| Example 10 | 85 | 59 | 0.6 | 46.40 | 10.34 | 13.3 | 6.84 | 2.51 | 1.53 | 1.50 | 4 |
| Example 11 | 80 | 50 | 0.7 | 31.63 | 0.1 or less | 4.93 | 0.30 | 0.003 | 0.004 | 0.003 | 4 |
| Comparative Example 6 | 89 | 81 | 0.4 | 75.38 | 69.50 | 10.88 | 10.94 | 9.43 | 9.72 | 12.01 | 4 |
| Comparative Example 7 | 80 | 47 | 0.6 | 45.07 | 41.55 | 8.21 | 6.97 | 5.10 | 4.24 | 4.21 | 1 |
| Comparative Example 8 | 78 | 47 | 0.7 | 47.15 | 20.10 | 4.70 | 3.10 | 1.80 | 1.30 | 1.20 | 1 |
| Comparative Example 9 | 89 | 75 | 0.5 | 68.87 | 63.76 | 9.98 | 10.10 | 8.50 | 9.01 | 11.25 | 4 |
| Comparative Example 10 | 70 | 35 | 1.9 | 32.30 | 0.1 or less | 1.57 | 0.09 | 0.05 | 0.03 | 0.04 | 4 |
| Comparative Example 11 | 85 | 70 | 0.4 | 28.83 | 45.20 | 8.10 | 9.34 | 10.10 | 10.20 | 22.20 | 4 |
| Comparative Example 12 | 82 | 40 | 0.4 | 25.26 | 38.40 | 6.24 | 9.44 | 10.17 | 10.81 | 15.14 | 4 |

EXAMPLE 12

(1) Preparation of Polyvinyl Butyral

To 2890 g of pure water, 275 g of polyvinyl alcohol having an average polymerization degree of 1700 and a saponification rate of 99.2 mole % was added and dissolved on heating. After the solution was adjusted to 15° C., 201 g of hydrochloric acid having a concentration of 35% by weight and 157 g of n-butyraldehyde were added and the mixture was incubated at 15° C. to precipitate a reaction product. Subsequently, the reaction system was held at 60° C. for 3 hours to carry the reaction to completion. The mixture was washed with an excess of water to remove the unreacted n-butyraldehyde and the catalyst hydrochloric acid was neutralized with aqueous sodium hydroxide solution, the common neutralizing agent. The product was rinsed with an excess of water for 2 hours and dried to provide a polyvinyl butyral resin as white powder. The average butyralization rate of this polyvinyl butyral resin was 68.5 mole %.

(2) Preparation of Plasticizer Containing Ultraviolet Absorber and Antioxidant

A plasticizer solution was prepared by stirring and mixing 40 parts by weight of triethylene glycol-di-ethylene butyrate (3GO), 0.2 parts by weight of 2,6-di-tert-butyl-p-cresol (BHT) (manufactured by Sumitomo Chemical Co., Ltd., Sumilizer BHT) as an antioxidant and 0.8 parts by weight of [(4-methoxyphenyl)-methylene]-dimethyl malonate (manufactured by Clariant, Hostavin PR-25) as a ultraviolet absorber until a homogeneous, transparent solution was formed.

(3) Preparation of Heat Ray Absorber-dispersing Plasticizer

To 40 parts by weight of the plasticizer solution, 1 part by weight of ITO powder (manufactured by Mitsubishi Materials Corporation) and 0.1 parts by weight of polyphosphate salt as a dispersion stabilizer were added. The ITO fine particle was dispersed in the plasticizer solution using a horizontal microbead mill. Subsequently, 0.2 parts by weight of acetylacetone was added to the solution while the solution was stirred. Thus a heat ray absorber-dispersing plasticizer was prepared.

(4) Production of Interlayer Film for Laminated Glass

To 100 parts by weight of polyvinyl butyral resin were added 40 parts by weight of heat ray absorber-dispersing plasticizer and magnesium 2-ethylbutyrate in a proper amount such that the Mg content relative to the entire system became 60 ppm. The blend was melt-kneaded fully through mixing rolls and then was press molded with a press molding machine at 150° C. for 30 minutes to provide an interlayer film with an average thickness of 0.76 mm.

(5) Production of Laminated Glass

The resulting interlayer film was interposed between transparent float glass sheets of 30 cm in length, 30 cm in width and 2.5 mm in thickness and the unit was placed in a rubber bag and deaerated under a degree of vacuum of 2660 Pa for 20 minutes. The deaerated unit was directly transferred to an oven and pressed under vacuum at 90° C. for 30 minutes. The prebonded laminated glass was compression bonded in an autoclave under conditions, a temperature of 135° C. and a pressure of 118 N/cm², for 20 minutes to provide a laminated glass.

EXAMPLE 13

A laminated glass was prepared in the same manner as Example 12 except changing the composition amount of a ultraviolet absorber [(4-methoxyphenyl)-methylene]-dimethyl malonate (manufactured by Clariant, Hostavin PR-25)

to 0.4 parts by weight and the composition amount of ITO powder (manufactured by Mitsubishi Materials Corporation) to 0.3 parts by weight.

EXAMPLE 14

A laminated glass was prepared in the same manner as Example 12 except changing the composition amount of a ultraviolet absorber [(4-methoxyphenyl)-methylene]-dimethyl malonate (manufactured by Clariant, Hostavin PR-25) to 0.4 parts by weight and the composition amount of ITO powder (manufactured by Mitsubishi Materials Corporation) to 0.6 parts by weight.

EXAMPLE 15

A laminated glass was prepared in the same manner as Example 12 except using a combination of 0.4 parts by weight of [(4-methoxyphenyl)-methylene]-dimethyl malonate (manufactured by Clariant, Hostavin PR-25) and 0.4 parts by weight of 2-(2'-hydroxy-3'-t-butyl-5'-methylphenyl)-5-chlorobenzotriazole (manufactured by Ciba-Geigy AG, Tinuvin 326) as ultraviolet absorbers in place of using 0.8 parts by weight of [(4-methoxyphenyl)-methylene]-dimethyl malonate (manufactured by Clariant, Hostavin PR-25).

EXAMPLE 16

A laminated glass was prepared in the same manner as Example 12 except using a combination of 0.2 parts by weight of [(4-methoxyphenyl)-methylene]-dimethyl malonate (manufactured by Clariant, Hostavin PR-25) and 0.2 parts by weight of 2-(2'-hydroxy-3'-t-butyl-5'-methylphenyl)-5-chlorobenzotriazole (manufactured by Ciba-Geigy AG, Tinuvin 326) as ultraviolet absorbers in place of using 0.8 parts by weight of [(4-methoxyphenyl)-methylene]-dimethyl malonate (manufactured by Clariant, Hostavin PR-25) and changing the composition amount of the ITO powder (manufactured by Mitsubishi Materials Corporation) to 0.3 parts by weight.

EXAMPLE 17

A laminated glass was prepared in the same manner as Example 12 except using a combination of 0.2 parts by weight of [(4-methoxyphenyl)-methylene]-dimethyl malonate (manufactured by Clariant, Hostavin PR-25) and 0.2 parts by weight of 2-(2'-hydroxy-3'-t-butyl-5'-methylphenyl)-5-chlorobenzotriazole (manufactured by Ciba-Geigy AG, Tinuvin 326) as ultraviolet absorbers in place of using 0.8 parts by weight of [(4-methoxyphenyl)-methylene]-dimethyl malonate (manufactured by Clariant, Hostavin PR-25) and changing the composition amount of the ITO powder (manufactured by Mitsubishi Materials Corporation) to 0.6 parts by weight.

EXAMPLE 18

A laminated glass was prepared in the same manner as Example 12 except using 0.8 parts by weight of 2-ethyl 2'-ethoxy-oxalanilide (manufactured by Clariant, Sanduvor VSU) as a ultraviolet absorber in place of using 0.8 parts by weight of [(4-methoxyphenyl)-methylene]-dimethyl malonate (manufactured by Clariant, Hostavin PR-25).

EXAMPLE 19

A laminated glass was prepared in the same manner as Example 12 except using 0.4 parts by weight of 2-ethyl 2'-ethoxy-oxalanilide (manufactured by Clariant, Sanduvor VSU) as a ultraviolet absorber in place of 0.8 parts by weight of [(4-methoxyphenyl)-methylene]-dimethyl malonate (manufactured by Clariant, Hostavin PR-25) and changing the composition amount of the ITO powder (manufactured by Mitsubishi Materials Corporation) to 0.3 parts by weight.

EXAMPLE 20

A laminated glass was prepared in the same manner as Example 12 except using a combination of 0.4 parts by weight of 2-ethyl 2'-ethoxy-oxalanilide (manufactured by Clariant, Sanduvor VSU) and 0.4 parts by weight of 2-(2'-hydroxy-3'-t-butyl-5'-methylphenyl)-5-chlorobenzotriazole (manufactured by Ciba-Geigy AG, Tinuvin 326) as a ultraviolet absorber in place of 0.8 parts by weight of [(4-methoxyphenyl)-methylene]-dimethyl malonate (manufactured by Clariant, Hostavin PR-25).

EXAMPLE 21

A laminated glass was prepared in the same manner as Example 12 except using a combination of 0.2 parts by weight of 2-ethyl 2'-ethoxy-oxalanilide (manufactured by Clariant, Sanduvor VSU) and 0.2 parts by weight of 2-(2'-hydroxy-3'-t-butyl-5'-methylphenyl)-5-chlorobenzotriazole (manufactured by Ciba-Geigy AG, Tinuvin 326) as a ultraviolet absorber in place of 0.8 parts by weight of [(4-methoxyphenyl)-methylene]-dimethyl malonate (manufactured by Clariant, Hostavin PR-25) and changing the composition amount of the ITO powder (manufactured by Mitsubishi Materials Corporation) to 0.3 parts by weight.

REFERENTIAL EXAMPLE 1

A laminated glass was prepared in the same manner as Example 12 except using 0.8 parts by weight of 2-(2'-hydroxy-3'-t-butyl-5'-methylphenyl)-5-chlorobenzotriazole (manufactured by Ciba-Geigy AG, Tinuvin 326) as a ultraviolet absorber in place of 0.8 parts by weight of [(4-methoxyphenyl)-methylene]-dimethyl malonate (manufactured by Clariant, Hostavin PR-25).

REFERENTIAL EXAMPLE 2

A laminated glass was prepared in the same manner as Example 12 except using 0.4 parts by weight of 2-(2'-hydroxy-3'-t-butyl-5'-methylphenyl)-5-chlorobenzotriazole (manufactured by Ciba-Geigy AG, Tinuvin 326) as a ultraviolet absorber in place of 0.8 parts by weight of [(4-methoxyphenyl)-methylene]-dimethyl malonate (manufactured by Clariant, Hostavin PR-25) and changing the composition amount of the ITO powder (manufactured by Mitsubishi Materials Corporation) to 0.3 parts by weight.

REFERENTIAL EXAMPLE 3

A laminated glass was prepared in the same manner as Example 12 except using 0.4 parts by weight of 2-(2'-hydroxy-3'-t-butyl-5'-methylphenyl)-5-chlorobenzotriazole (manufactured by Ciba-Geigy AG, Tinuvin 326) as a ultraviolet absorber in place of 0.8 parts by weight of [(4-methoxyphenyl)-methylene]-dimethyl malonate (manufactured by Clariant, Hostavin PR-25) and changing the composition amount of the ITO powder (manufactured by Mitsubishi Materials Corporation) to 0.6 parts by weight.

REFERENTIAL EXAMPLE 4

A laminated glass was prepared in the same manner as Example 12 except using 0.8 parts by weight of octabenzone (manufactured by Ciba-Geigy AG, Chimassorb 81) as a ultraviolet absorber in place of 0.8 parts by weight of [(4-methoxyphenyl)-methylene]-dimethyl malonate (manufactured by Clariant, Hostavin PR-25).

REFERENTIAL EXAMPLE 5

A laminated glass was prepared in the same manner as Example 12 except using 0.4 parts by weight of octabenzone (manufactured by Ciba-Geigy AG, Chimasorb 81) as a ultraviolet absorber in place of 0.8 parts by weight of [(4-methoxyphenyl)-methylene]-dimethyl malonate (manufactured by Clariant, Hostavin PR-25) and changing the composition amount of the ITO powder (manufactured by Mitsubishi Materials Corporation) to 0.3 parts by weight.

REFERENTIAL EXAMPLE 6

A laminated glass was prepared in the same manner as Example 12 except using 0.8 parts by weight of 2,4-tert-butylphenyl-3,5-di-tert-butyl-4-hydroxybenzoate (manufactured by Ciba-Geigy AG, Tinuvinl20) as a ultraviolet absorber in place of 0.8 parts by weight of [(4-methoxyphenyl)-methylene]-dimethyl malonate (manufactured by Clariant, Hostavin PR-25).

REFERENTIAL EXAMPLE 7

A laminated glass was prepared in the same manner as Example 12 except using 0.4 parts by weight of 2,4-tert-butylphenyl-3,5-di-tert-butyl-4-hydroxybenzoate (manufactured by Ciba-Geigy AG, Tinuvinl20) as a ultraviolet absorber in place of 0.8 parts by weight of [(4-methoxyphenyl)-methylene]-dimethyl malonate (manufactured by Clariant, Hostavin PR-25) and changing the composition amount of the ITO powder (manufactured by Mitsubishi Materials Corporation) to 0.3 parts by weight.

The laminated glasses prepared in Examples 12 to 21 and Referential Examples 1 to 7 were evaluated by the following methods.

The results are presented in Table 4.

(Measurement of Initial Optical Characteristics)

The visible light transmittance Tv in a wavelength region of 380 to 780 nm (before SUV irradiation), the yellow index value YI (before SUV irradiation) and the b*valued (before SUV irradiation) in the CIE1976 L*a*b* color system were determined in accordance with JIS Z 8722 and JIS R 3106 by means of a direct recording spectrophotometer (manufactured by Shimadzu Corporation, U-4000).

(Measurement of Optical Characteristics after SUV Irradiation Test)

A 5 cm by 10 cm irradiation sample was prepared and an SUV irradiation test was conducted under the following conditions.

Test apparatus: EYE SUPER UV TESTER (manufactured by IWASAKI ELECTRIC Co., Ltd., model SUV-F11)
UV intensity: 100 mW/cm$^2$
Limiting wavelength: 295 to 450 nm
Black panel temperature: 63° C.
Irradiation time: Sampled at times of 100, 200, 300 hours
Irradiation distance: 235 mm The visible light transmittance Tv in a wavelength region of 380 to 780 nm (after SUV irradiation), the yellow index value YI (after SUV irradiation) and the b*value (after SUV irradiation) in the CIE1976 L*a*b* color system were determined in accordance with JIS Z 8722 and JIS R 3106 by means of a direct recording spectrophotometer (manufactured by Shimadzu Corporation, U-4000). According to the following formulas, ΔTv, ΔYI and Δb* were calculated.

$$\Delta Tv = Tv(\text{after } SUV \text{ irradiation}) - Tv(\text{before } SUV \text{ irradiation}) \quad (1)$$

$$\Delta YI = YI(\text{after } SUV \text{ irradiation}) - YI(\text{before } SUV \text{ irradiation}) \quad (2)$$

$$\Delta b^* = b^*(\text{after } SUV \text{ irradiation}) - b^*(\text{before } SUV \text{ irradiation}) \quad (3)$$

TABLE 4

|  | ΔT$_V$(%) | | | ΔYI | | | Δb* | | |
| --- | --- | --- | --- | --- | --- | --- | --- | --- | --- |
|  | After 100 hours | After 200 hours | After 300 hours | After 100 hours | After 200 hours | After 300 hours | After 100 hours | After 200 hours | After 300 hours |
| Example 12 | −1.5 | −1.5 | −1.5 | −1.5 | −1.4 | −1.0 | −0.9 | −0.8 | −0.6 |
| Example 13 | −0.8 | −0.8 | −0.8 | — | — | — | — | — | — |
| Example 14 | −0.9 | −0.9 | −0.9 | — | — | — | — | — | — |
| Example 15 | −1.4 | −1.3 | −1.6 | −0.5 | 0.7 | 2.4 | −0.3 | 0.4 | 1.3 |
| Example 16 | −0.5 | −0.5 | −0.5 | — | — | — | — | — | — |
| Example 17 | −0.7 | −0.7 | −0.8 | — | — | — | — | — | — |
| Example 18 | −1.5 | −1.6 | −1.6 | −1.3 | −1.1 | −0.9 | −0.8 | −0.6 | −0.3 |
| Example 19 | −0.7 | −0.7 | −0.7 | — | — | — | — | — | — |
| Example 20 | −1.4 | −1.5 | −1.7 | −0.2 | 1.0 | 2.6 | −0.2 | 0.5 | 1.5 |
| Example 21 | −0.6 | −0.6 | −0.9 | — | — | — | — | — | — |
| Referential Example 1 | −1.5 | −2.3 | −3.1 | 1.5 | 4.6 | 7.7 | 0.9 | 2.7 | 4.4 |
| Referential Example 2 | −0.7 | −1.5 | −2.1 | — | — | — | — | — | — |
| Referential Example 3 | −0.9 | −2.1 | −2.9 | — | — | — | — | — | — |
| Referential Example 4 | −1.8 | −2.6 | −3.7 | 1.6 | 4.5 | 7.9 | 0.9 | 2.7 | 4.5 |
| Referential Example 5 | −1.0 | −1.6 | −2.4 | — | — | — | — | — | — |
| Referential Example 6 | −1.7 | −2.6 | −4.0 | 1.5 | 4.7 | 8.0 | 0.9 | 2.8 | 4.6 |
| Referential Example 7 | −1.0 | −1.7 | −2.7 | — | — | — | — | — | — |

INDUSTRIAL APPLICABILITY

The present invention can provide an interlayer film for a laminated glass and a laminated glass, which are superior in transparency, heat shield property, electromagnetic wave permeability and weatherability.

The invention claimed is:

1. An interlayer film for a laminated glass,
    wherein the film is made of plasticized polyvinylacetal resin composition,
    the plasticized polyvinylacetal resin composition contains 100 parts by weight of a polyvinylacetal resin, 20 to 60 parts by weight of a plasticizer and 0.1 to 3 parts by weight of at least one kind of a fine particle selected from the group consisting of a tin-doped indium oide (ITO) fine particle, an antimony-dope tin oxide (ATO) fine particle, an aluminum-doped zinc oxide (AZO) fine particle, an indium-dope zinc oxide (IZO) fine particle, a tin-doped zinc oxide fine particle, a silicon-doped zinc oxide fine particle, a lanthanum hexaboride fine particle and cerium hexaboride fine particle, and
    the fine particle has an average particle diameter of 80 nm or less, and a particle having a particle diameter of 100 nm or more is dispersed in a density of one particle/$\mu m^2$ or less,
    wherein the plasticized polyvinylacetal resin composition further contains a malonic ester compound and/or an oxalic acid anilide compound as an ultraviolet absorber, and
    wherein a laminated glass, produced by interposing the film between two sheets of glass selected from the group consisting of clear glass, green glass and high heat ray absorbing glass, has the decrease of the visible light transmittance of the laminated glass after irradiating the ultraviolet ray of 2.0% or less, when irradiated with ultraviolet ray with an intensity of 100 mW/$cm^2$ and wavelength of 295 to 450 nm for 300 hours.

2. The interlayer film for a laminated glass according to claim 1,
    wherein a laminated glass, produced by interposing the film between two sheets of glass selected from the group consisting of clear glass, green glass and high heat ray absorbing glass, has the increase of the yellow index value of the laminated glass after irradiating the ultraviolet ray of 4.0 or less, when irradiated with ultraviolet ray with an intensity of 100 mW/$cm^2$ and wavelength of 295 to 450 nm for 300 hours.

3. The interlayer film for a laminated glass according to claim 1,
    wherein a laminated glass, produced by interposing the film between two sheets of glass selected from the group consisting of clear glass, green glass and high heat ray absorbing glass, has the increase of the b* value of the laminated glass, in the CIE 1976 L*a*b* color system, after irradiating the ultraviolet ray of 3.0 or less, when irradiated with ultraviolet ray with an intensity of 100 mW/$cm^2$ and wavelength of 295 to 450 nm for 300 hours.

4. The interlayer film for a laminated glass according to claim 1,
    wherein the solar radiation transmittance is 85% or less of the visible light transmittance in a wavelength region of 300 to 2100 nm.

5. The interlayer film for a laminated glass according to claim 1,
    wherein the film is made of a plasticized polyvinylacetal resin composition,
    the plasticized polyvinylacetal resin composition contains 100 parts by weight of a polyvinylacetal resin, 20 to 60 parts by weight of a plasticizer and 0.00001 to 5 parts by weight of at least one kind of a compound selected from the group consisting of a diimmonium pigment, an aminium pigment, a phthalocyanine pigment, an anthraquinone pigment, a polymethine pigment, a benzenedithiol ammonium compound, a thiourea derivatives and a thiol metallic complexes, and
    the compound is dispersed uniformly within the plasticized polyvinylacetal resin composition.

6. The interlayer film for a laminated glass according to claim 1,
    wherein the film is made of a plasticized polyvinylacetal resin composition,
    the plasticized polyvinylacetal resin composition contains 100 parts by weight of a polyvinylacetal resin, 20 to 60 parts by weight of a plasticizer, 0.1 to 3 parts by weight of at least one kind of a fine particle selected from the group consisting of a tin-doped indium oxide (ITO) fine particle, an antimony-doped tin oxide (ATO) fine particle, an aluminum-doped zinc oxide (AZO) fine particle, an indium-doped zinc oxide (IZO) fine particle, a tin-doped zinc oxide fine particle, a silicon-doped zinc oxide fine particle, a lanthanum hexaboride fine particle and a cerium hexaboride fine particle and 0.00001 to 5 parts by weight of at least one kind of compound selected from the group consisting of a diimmonium pigment, an aminium pigment, a phthalocyanine pigment, an anthraquinone pigment, a polymethine pigment, a benzenedithiol ammonium compound, a thiourea derivatives and a thiol metallic complexes,
    the fine particle has an average particle diameter of 80 nm or less, and a particle having a particle diameters of 100 nm or more is dispersed in a density of one particle/$\mu m^2$ or less, and
    the compound is dispersed uniformly within the plasticized polyvinylacetal resin composition.

7. The interlayer film for a laminated glass according to claim 1,
    wherein the polyvinylacetal resin is a polyvinyl butyral resin.

8. The interlayer film for a laminated glass according to claim 1,
    wherein the plasticized polyvinylacetal resin composition further contains, as an ultraviolet absorber, a mixture of a malonic ester compound and/or an oxalic acid anilide compound with at least one compound selected from the group consisting of a benzotriazole compound, a benzophenone compound, a triazine compound, a benzoate compound and hindered amine compound.

9. The interlayer film for a laminated glass according to claim 1,
    wherein the plasticized polyvinylacetal resin composition further contains, as an adhesive adjuster, an alkali metal salt or alkaline-earth metal salt of an organic or inorganic acid, or a modified silicone oil.

10. The interlayer film for a laminated glass according to claim 1,
    wherein the plasticized polyvinylacetal resin composition further contains, as a dispersion stabilizer, at least one kind of compound selected from the group consisting of sulfuric ester compound, phosphate ester compound, ricinoleic acid, polyricinoleic acid, polycarboxylic acid, a polyhydric alcohol surfactant, polyvinyl alcohol and polyvinyl butyral.

11. A laminated glass, obtained by using the interlayer film for a laminated glass according to claim 1.

12. A window material for vehicle, obtained by using the laminated glass according to claim 11.

13. A vehicle, obtained by using the window material for vehicle according to claim 12.

14. A building material, obtained by using the laminated glass according to claim 11.

15. A building, obtained by using the building material according to claim 14.

* * * * *